US012140499B2

(12) United States Patent
Ruhs

(10) Patent No.: US 12,140,499 B2
(45) Date of Patent: Nov. 12, 2024

(54) OVERRUNABLE TEST VEHICLE

(71) Applicant: Humanetics Austria GmbH, Linz (AT)

(72) Inventor: Lukas Ruhs, Linz (AT)

(73) Assignee: Humaneties Austria GmbH, Linz (AT)

( * ) Notice: Subject to any disclaimer, the term of this patent is extended or adjusted under 35 U.S.C. 154(b) by 190 days.

(21) Appl. No.: 17/677,561

(22) Filed: Feb. 22, 2022

(65) Prior Publication Data

US 2023/0266202 A1 Aug. 24, 2023

(51) Int. Cl.
*G01M 17/00* (2006.01)
*B60L 15/20* (2006.01)
(Continued)

(52) U.S. Cl.
CPC ......... *G01M 17/0078* (2013.01); *B60L 15/20* (2013.01); *G01L 5/28* (2013.01)

(58) Field of Classification Search
CPC .......... B60T 8/88; B60T 8/171; B60T 8/1761; B60T 8/172; B60T 8/17616;
(Continued)

(56) References Cited

U.S. PATENT DOCUMENTS 4,530,056 A * 7/1985 MacKinnon ......... G05D 1/0272 701/25
5,338,206 A * 8/1994 Hupfer .............. G01M 17/0078 318/587
(Continued)

FOREIGN PATENT DOCUMENTS

EP 4012369 6/2022
WO 2016015793 A1 2/2016

OTHER PUBLICATIONS

English Language abstract and original German language document of Hofmanniger, Patrick, “Autonome Regelung eines PKW mit Fahrroboter”, Masterabeit, Johannes Kepler Universitat Linz, Jun. 2018, 77 pages.

(Continued)

*Primary Examiner* — Phutthiwat Wongwian
*Assistant Examiner* — Sherman D Manley
(74) *Attorney, Agent, or Firm* — Howard & Howard Attorneys PLLC

(57) ABSTRACT

The present teachings generally provide for an overrunable test vehicle for dynamic vehicle testing of advanced driver assistant systems along a driving plane. The overrunable test vehicle comprising a chassis with a first end and a second end and including a mounting area configured to receive a soft target, and defining an axis of rotation transverse to the driving plane between the first end and the second end, four drive mechanisms coupled with the chassis, each drive mechanism having an electric motor with a drive wheel, and a control system coupled with the electric motors, and configured to control speed and torque of each of the electric motors, forming a torque vector that rotates the overrunable test vehicle about the axis of rotation to a target rotation angle. The axis of rotation is a location between the two drive mechanisms that the chassis turns about when the torque vector is applied to the chassis of the overrunable test vehicle.

18 Claims, 18 Drawing Sheets

10
62
12
99
99
22

(51) Int. Cl.
*G01L 5/28* (2006.01)
*G01M 17/007* (2006.01)

(58) Field of Classification Search
CPC .... B60T 13/142; B60T 13/66; B60T 2250/04; B60T 2270/406; B60T 17/221; G01L 5/28; G01M 17/0078; F16D 65/14; F16D 66/00; F16D 2066/005; F16D 2121/04
See application file for complete search history.

(56) References Cited

U.S. PATENT DOCUMENTS

| | | | | |
|---|---|---|---|---|
| 8,190,344 | B2 | 5/2012 | Krueger et al. | |
| 8,589,062 | B2 * | 11/2013 | Kelly | G01M 17/0078 434/305 |
| 9,182,942 | B2 * | 11/2015 | Kelly | G08G 1/167 |
| 9,827,998 | B1 * | 11/2017 | Kelly | G01M 17/0078 |
| 10,086,810 | B2 * | 10/2018 | Binder | B60T 8/1755 |
| 10,379,007 | B2 * | 8/2019 | Perrone | B60W 10/04 |
| 10,830,670 | B2 * | 11/2020 | Simader | G01M 17/0078 |
| 11,541,858 | B2 * | 1/2023 | Wirthl | B60T 13/66 |
| 2013/0018528 | A1 * | 1/2013 | Kelly | B60T 7/18 701/41 |
| 2016/0036308 | A1 * | 2/2016 | Bailey | B63H 21/20 310/91 |
| 2018/0163818 | A1 * | 6/2018 | Normandeau | F16H 1/227 |
| 2018/0170395 | A1 * | 6/2018 | Luo | G05D 1/0088 |
| 2018/0257652 | A1 * | 9/2018 | Mueller | B60L 15/2045 |
| 2019/0301977 | A1 | 10/2019 | Jeong et al. | |
| 2021/0046913 | A1 * | 2/2021 | Wirthl | B60T 8/88 |
| 2021/0048820 | A1 * | 2/2021 | Trazkovich | G05D 1/249 |
| 2022/0379820 | A1 | 12/2022 | Kuwae et al. | |

OTHER PUBLICATIONS

English Language abstract and original German language document of Proprentner, L. , "Modellierung, Fahrwerkanalyse und Regelung eines Ultraflachen Mobilen Roboters", Masterabeit, Johannes Kepler Universität Linz, Jun. 2018, 80 pages.

Ryan, Jonathan et al., "Tire Radius Determination and Pressure Loss Detection Using GPS and Vehicle Stability Control Sensors", 8th IFAC Symposium on Fault Detection, Supervision and Safey of Technical Processes, Aug. 29-31, 2012, Mexico City, MX, 6 pages.

Partial Machine-Assisted English Translation and original German language document of Schoberl, Markus, "Prozessautomatisierung II, Stand SS 18", 2018, 99 pages.

English language abstract and original German lanuage document for Wirthl, David., "Entwicklung eines Fahrroboters zum Testen von Fahrerassistenz-Systemen", Masterarbeit, Johannes Kepler Universität Linz, Jun. 2016, 35 pages.

English language abstract of Ammon, D., "Modellbildung und Systementwicklung in der Fahrzeugdynamik", ("Modeling and System Development in Vehicle Dynamics"), ISBN: 3-519-02378-4, 1997, 1 page.

Euro NCAP, "AEB Car-to-Car Systems en Test Protocol", https://www.euroncap.com/en/forengineers/, Introduced in 2014, updated in 2020, 3 pages.

Hoffman, G. et al., "Autonomous Automobile Trajectory Tracking for Off-Road Driving: Controller Design, Experimental Validation and Racing", American Control Conference, 2007, 6 pages.

Kaiser, G. et al. "Torque Vectoring With a Feedback and Feed Forward Controller—Applied to a Through the Road Hybrid Electric Vehicle", IEEE Intelligent Vehicles Symposium, Jul. 2011, pp. 448-453.

English language translation of abstract/summary of Matschinsky, W., Radführungen der Straßenfahrzeuge: Kinematik, Elasto-Kinematic und Konstruktion, vol. 3, ("Wheel Guides of Road Vehicles: Kinematics, Rlasto-kinematics and Construction"), Springer Berlin Heidelberg, ISBN: 978-3-540,71196.4, 2007, 1 page.

English language abstract of Obermuller, P., ""Modellbasierte Fahrzustandsschätzung zur Ansteuerung einer aktiven Hinterachskinematik"", ("Model based identification of vehicle handling for controlling vehicle dynamics with rear wheel steering'), Technische Universität Munchen, 2012, 1 page."

Description and Table of Contents of Pacejka, H.B. et al., "Tire and Vehicle Dynamics", Third Edition, Butterworth-Heinemann, ISBN 978-08-097016-5, 2012, 9 pages.

English language abstract of Reif, K. "Bremsen und Bremsregelsysteme", ("Brakes and Brake Control Systems"), Vieweg + Teubner, ISBN: 8348-1311-4; 2010, 1 page.

English language abstract of Intoduction of Rothuß, R., "Anwendung der flachheitsbasierten Analyse und Regelung hichtlinearer Mehrgrößensysteme, Fortschritt-Berichte VDI Reihe 8, Meß-, SteuerungsundFortschritt-Berichte VDI Reihe 8, Meß-, Steuerungsund Regelungstechnik", (Rothfuss, R., "Application of Flatness-Based Analysis and Control of Non-Linear Multivalue Systems, Progress Reports VDI Series 8, Measurement, Control and Progress Reports VDI Series 8, Measurement, Control and Regulator Technology"), ISBN: 978318366, 1997, Nr. 664, 1 page.

Savitzky, A. et al., "Smoothing and Differentiation of Data by Simplified Least Squares Procedures", Analytical Chemistry, vol. 36.8, 1964, pp. 1627-1639.

English language translsation of Introduction of Schramm, D. et al., ""Modellbildung und Simulation der Dynamik von Kraftfahrzeugen"", (Modeling and Simulation of the Dynamics of Motor Vehicles), Berlin, Springer, ISBN 978354089315, 2010, 2 pages.

Transport Policy, "Vehicle Definitions", https://www.transportpolicy.net/standard/eu-vehicle-definitions/, 2018, 7 pages.

English language translation of Introduction of Vietinghoff, A., "Nichtlineare Regelung von Kraftfahrzeugen in Querdynamisch Kritischen Farsituationen", ("Nonlinear Control of Motor Vehicles in Lateral Dynamics Critical Driving Situations"), Universiatve Karlsruhe, ISBN 9.783866442238, 2008, 1 page.

English language abstract for WO 2016/015793 A1 extracted from espacenet.com database on Aug. 10, 2022, 1 page.

Austrian Search Report for Application GM 50020/2024 dated Sep. 12, 2024, 1 page.

* cited by examiner 12
99
62
99
10
22

12
28
61
10
28

10
15
23
24
26
27
28
60
61
65
66
68
70
73
74
80
82
102

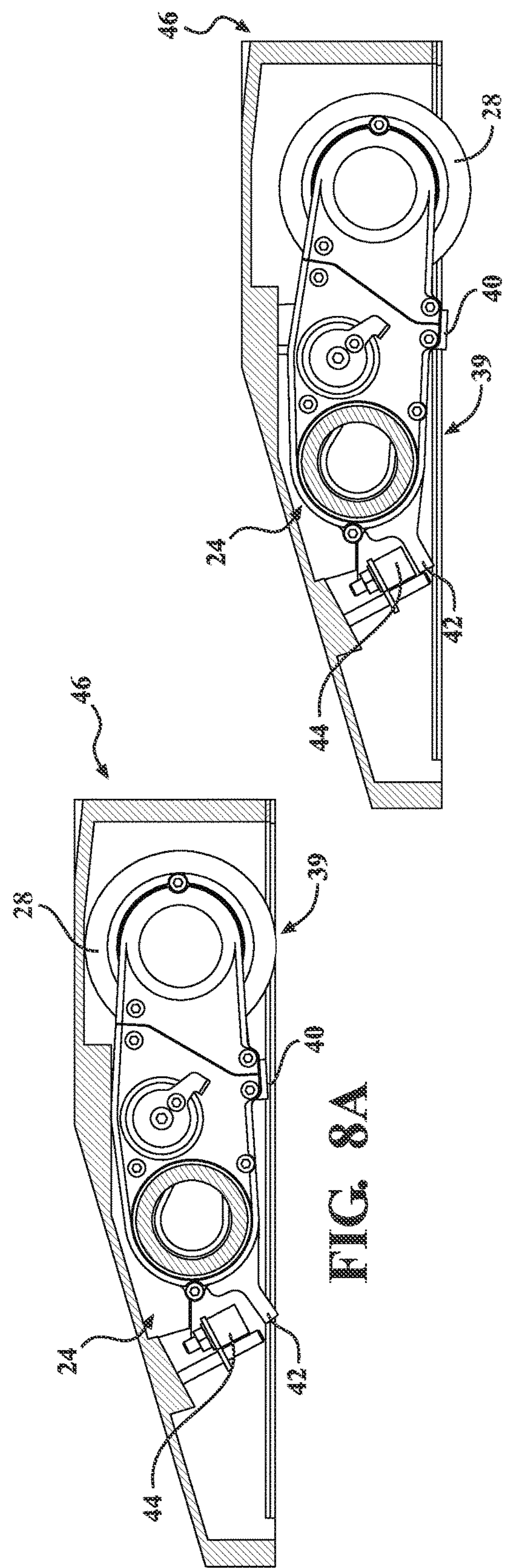
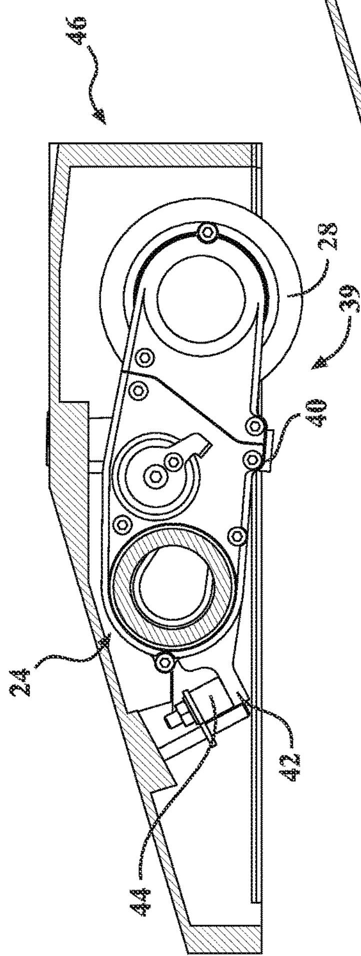
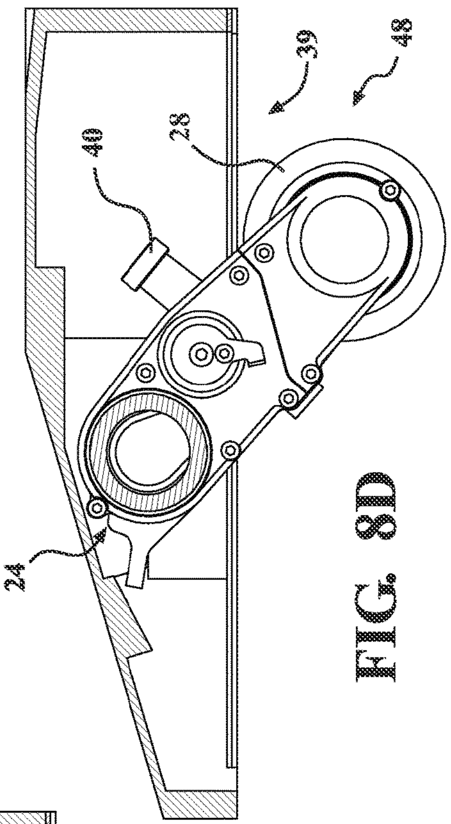
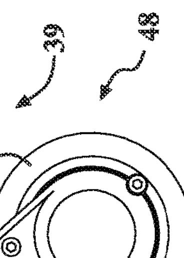

OVERRUNABLE TEST VEHICLE

BACKGROUND

With the rise of Advanced Driver Assistant Systems (ADAS) being developed and tested, the need for testing equipment which reduce risk to testing members, while being able to sustain potentially damaging impacts and scenarios has drastically increased. A paramount tool in testing the developing crash avoidance technologies is the use of mobile and controllable platforms. The mobile platforms are adapted to hold a simulated target objects such as an automobile, truck, pedestrian, bicycle, or similar. The simulated target is typically made of a material which will not damage the vehicle equipped with the ADAS, such as foam, cardboard, or any other soft material.

During testing, different soft targets may be employed in different scenarios to obtain different data from the ADAS systems. Depending on the soft target, different mobile test platforms may be used in order to better simulate the particular test scenario to test certain features of the crash avoidance technologies integrated into passenger vehicles.

SUMMARY

The present teachings generally provide for an overrunable test vehicle configured to carry a soft target. The overrunable test vehicle comprises a chassis, a first axle arrangement and a second axle arrangement connected to opposite ends of the chassis, a ground speed sensor supported by the chassis for determining a ground speed of the chassis, and a control system. Each axle arrangement includes two electric motors connected to each of the first axle arrangement and the second axle arrangement, and one wheel connected to each of the electric motors. The control system is operatively connected with the electric motors and the ground speed sensor, the control system is configured to calculate a difference between the rotational speed of each wheel connected to each of the electric motors and the ground speed of the chassis to determine a target slip between each wheel and a driving plane, calculate a torque output and a speed output for each of the electric motors, and control a motor parameter of the electric motors to apply a torque vector to the chassis, rotating the chassis about an axis of rotation from a first trajectory angle to a target trajectory angle. The torque outputs for each of the electric motors on the same axle are different. Torque output values of each of the electric motors corresponds to a speed output value of each of the electric motors.

The present teachings further provide for an overrunable test vehicle for dynamic vehicle testing of advanced driver assistant systems along a driving plane. The overrunable test vehicle comprising a chassis with a first end and a second end and including a mounting area configured to receive a soft target, and defining an axis of rotation transverse to the driving plane between the first end and the second end, four drive mechanisms coupled with the chassis, each drive mechanism having an electric motor with a drive wheel, and a control system coupled with the electric motors, and configured to control speed and torque of each of the electric motors, forming a torque vector that rotates the overrunable test vehicle about the axis of rotation to a target rotation angle. The axis of rotation is a location between the two drive mechanisms that the chassis turns about when the torque vector is applied to the chassis of the overrunable test vehicle, perpendicular to the driving plane.

The teachings further provide for a method for maneuvering an overrunable test vehicle at highway speeds with the overrunable test vehicle having a chassis connected with four electric motors each having a wheel, and a control system. The method comprising determining a ground speed of the overrunable test vehicle while the overrunable test vehicle is traveling along a first trajectory; determining a first target angle of rotation of the overrunable test vehicle corresponding to a first target trajectory; calculating a wheel slip based on the ground speed using the control system; calculating individual speed and torque outputs for each of the four motors; and rotating the overrunable test vehicle to the first target angle of rotation from the first trajectory by controlling a motor parameter of the four electric motors using the control system to adjust speed and torque of each of the electric motors, applying a first torque vector to the overrunable test vehicle. The speed and torque of at least two of the four electric motors are the same.

BRIEF DESCRIPTION OF THE DRAWINGS

Advantages of the present disclosure will be readily appreciated as the same becomes better understood by reference to the following detailed description when considered in connection with the accompanying drawings.

FIG. 8A-8D illustrates a drive train and suspension system at different positions.

DETAILED DESCRIPTION

The explanations and illustrations presented herein are intended to acquaint others skilled in the art with the teachings, its principles, and its practical application. Those skilled in the art may adapt and apply the teachings in its numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

Figure 1:
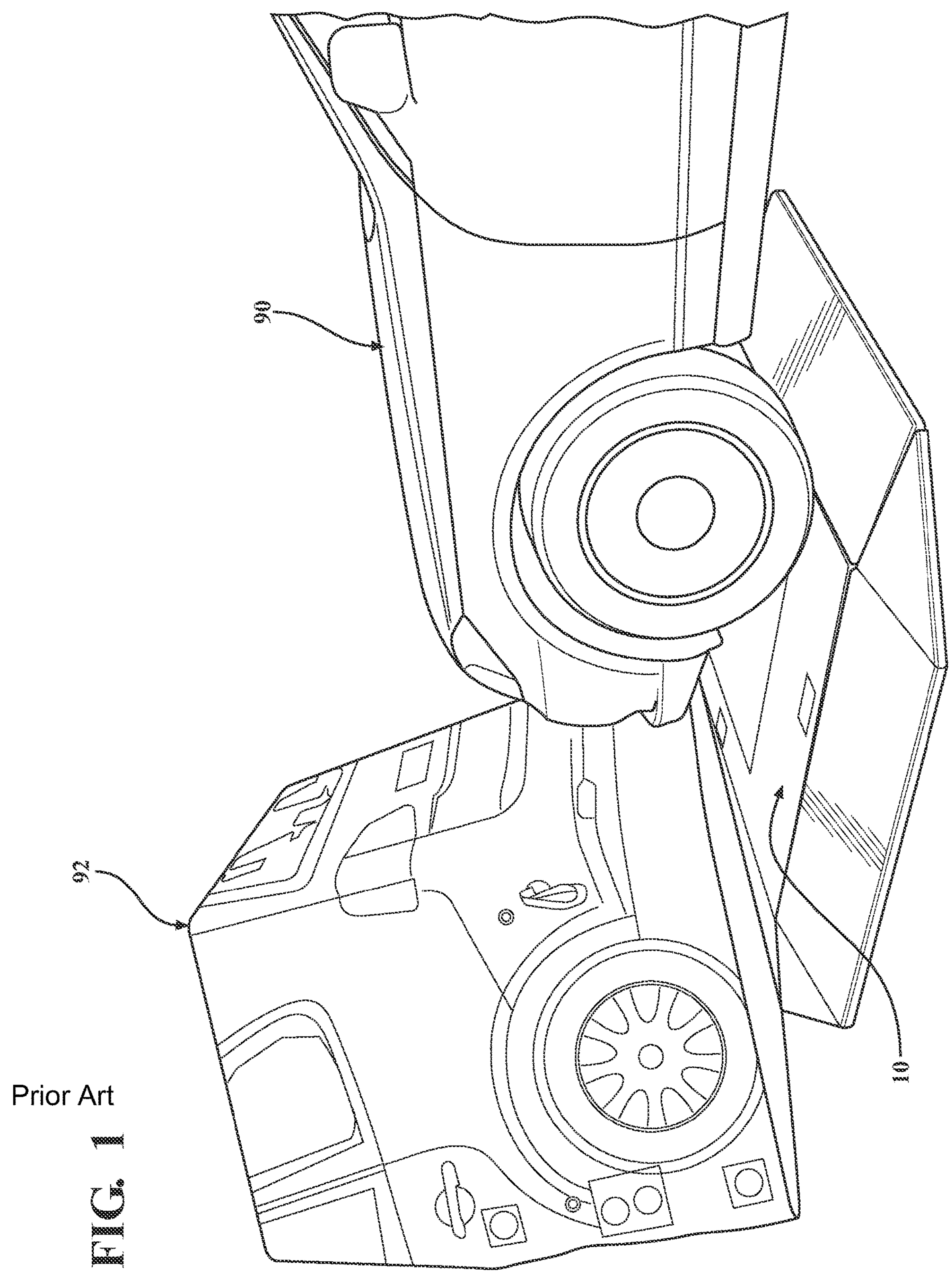
FIG. 1 is a perspective view of an overrunable test vehicle with a soft target being struck by a vehicle.
Figure 2:
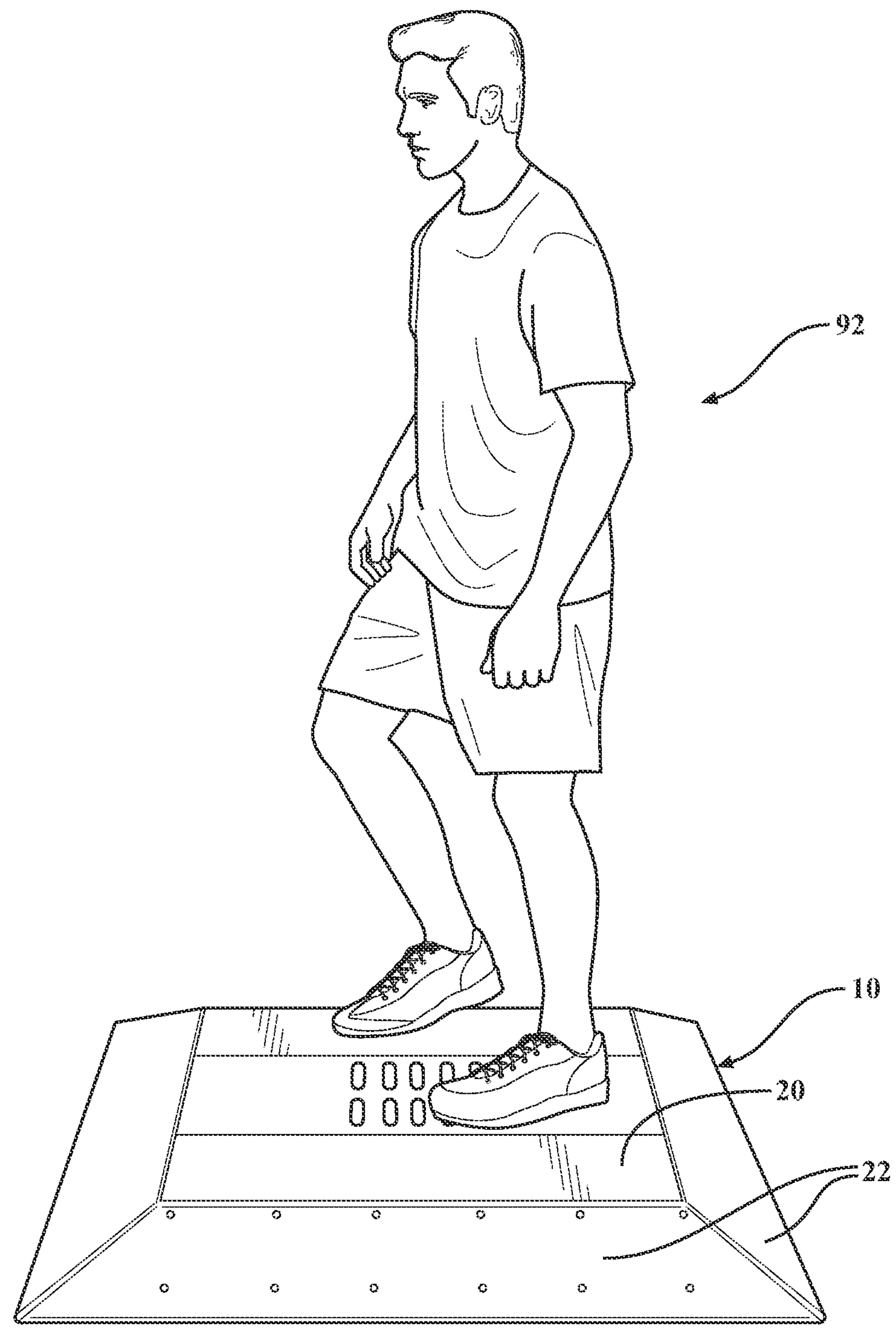
FIG. 2 is a perspective view of an overrunable test vehicle and soft target.

The present teachings relate to a test vehicle used in advanced crash avoidance technologies. A test vehicle 10, prior art examples seen in FIGS. 1 and 2, may function as a mobile and controllable platform for holding a simulated target object 92 such as an automobile, truck, pedestrian, bicycle, or similar. FIG. 1 shows one example of a large overrunable test vehicle 10 configured to carry a soft target 92 representing a vehicle. FIG. 2 shows a large overrunable test vehicle 10 with a pedestrian soft target 92. The overrunable test vehicle 10 depicted in FIGS. 1 and 2 are typically used for full-size soft targets 92, such as a car or truck.

The test vehicle 10 is an overrunable test vehicle 10 (herein OTV). During crash avoidance testing, the OTV may be subjected to rigorous conditions, including be run over by a vehicle 90 with advanced crash avoidance technologies. The OTV 10 may be configured to withstand the weight of an automobile. For example, the OTV 10 may be able to withstand a passenger car of 3.5 tons. The OTV 10 may be configured to hold 4 tons per wheel. The OTV 10 may be configure to hold an automobile consistent with category M1 of the EU vehicle definitions (https://www.transportpolicy.net/standard/eu-vehicle-definitions/). In some examples, the OTV 10 may be configured to move a soft target with a weight of 5 kilograms (kg) or more, 10 kg or more, 20 kg or more, 50 kg or more, or even 75 kg or more. In some examples, the OTV 10 may be able to move the one or more soft targets to a speed of 80 kph or more. In some examples, the OTV 10 may have a different top speed loaded than when the OTV 10 is free from a soft target. In some examples, the OTV may have a top speed of over 100 kph when loaded with a soft target weighing between 10 kg and 50 kg or more.

Figures 3, 4:
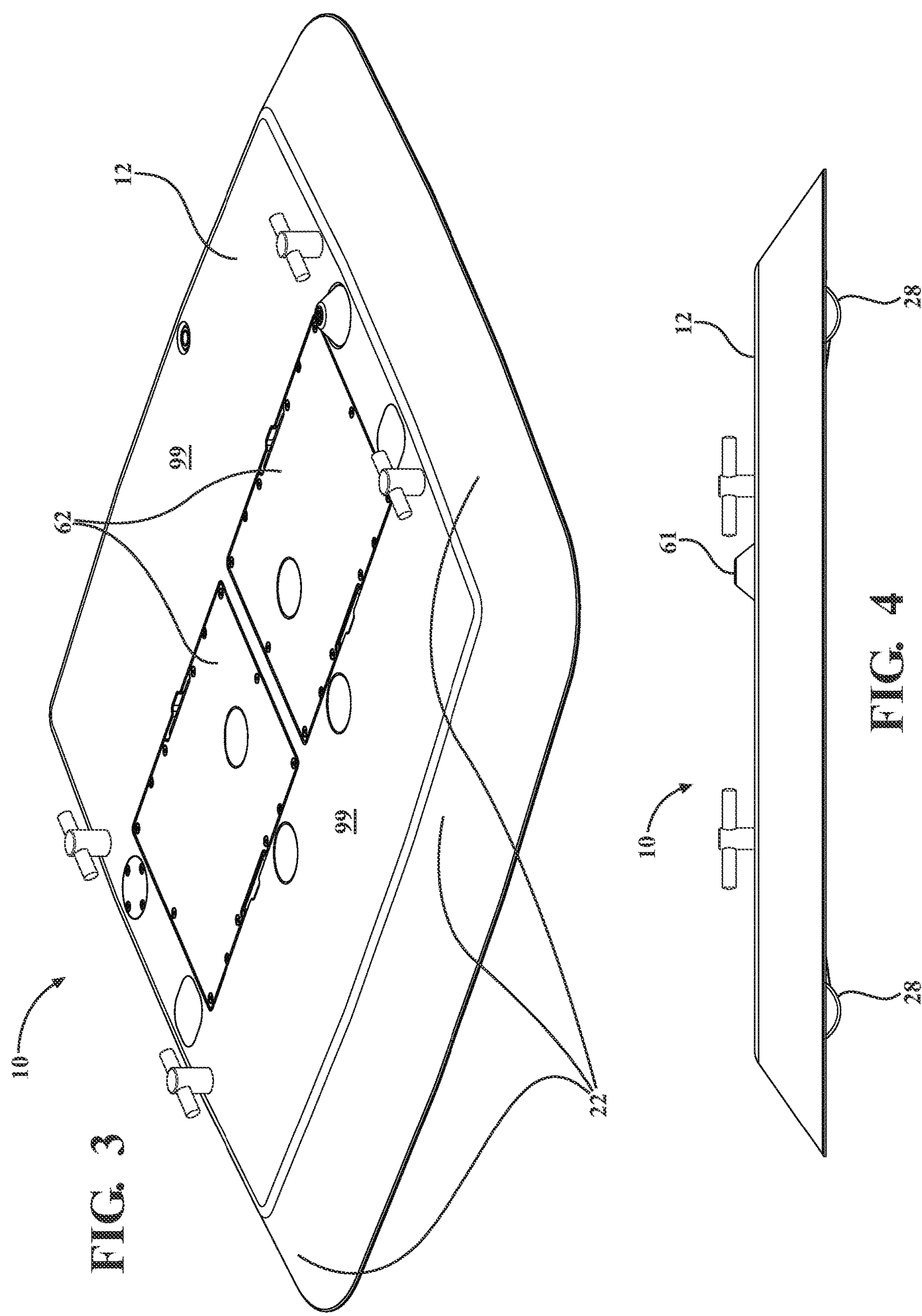
FIG. 3 is a perspective view of an overrunable test vehicle.
FIG. 4 is a side view of an overrunable test vehicle.

Turning to FIGS. 3 and 4, the OTV 10 includes a chassis 12. The chassis 12 (also referred to as frame) may function as the base structure of the test vehicle. The frame may be made of steel, composite material, aluminum, plastic, or a combination thereof. In some examples, the chassis 12 may be a unitary component. In other examples, the chassis 12 may be made of two or more modular components. For example, the chassis 12 may be made from a single block of machined aluminum. The chassis 12 may be divided into several sections corresponding with certain features of the OTV. The sections of the frame/chassis 12 may be divided into separate compartments to house the different systems and components of the OTV 10. The chassis 12 may have a generally geometric shape. For example, the chassis 12 may have a shape such as rectangular, square, circular, triangular, polygonal or the like. The chassis 12 may have an overall length of 200 cm or less. In some examples, the frame has an overall length of 150 cm or less, or even 110 cm or less. In some examples, the chassis 12 may have a relatively consistent thickness. In other examples, the chassis 12 may have a varying thickness. As provided for below, the chassis 12 of the OTV 10 may be divided into two or more sections.

With reference to FIGS. 3 and 4, chassis 12 functions to protect the control systems of the test vehicle 10. The chassis 12 may function to allow a vehicle 90 ride over the top of the test vehicle 10 without damaging the components within the chassis 12. The chassis 12 may include one or more battery housings 63 with covers 62 for locating one or more batteries 82 within the chassis 12 of the OTV 10. The batteries 82 may be located in a battery housing 63 within the chassis 12 and include a battery lid 62 which is flush with the top surface 99.

Figure 5:
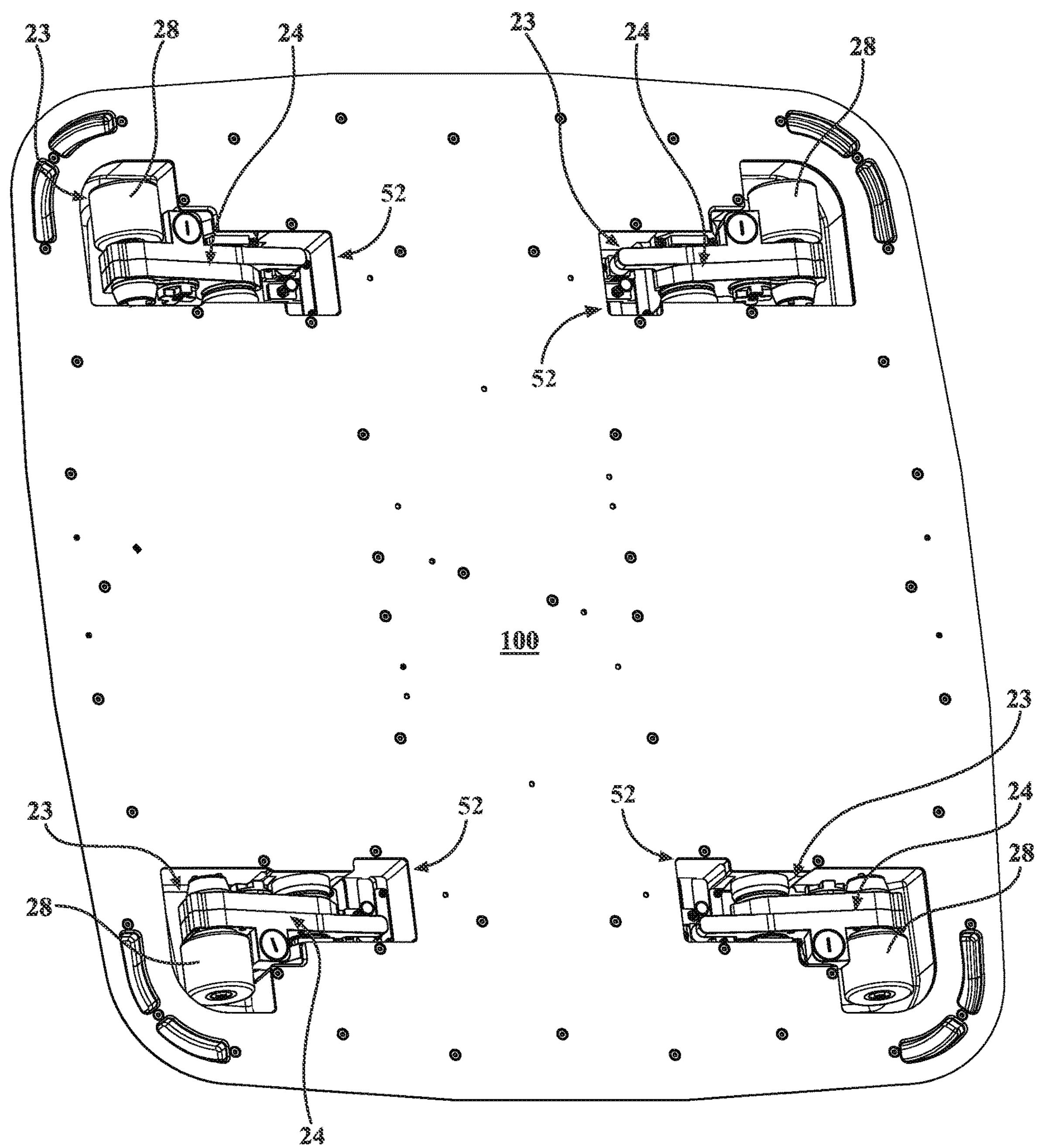
FIG. 5 is a bottom perspective view of the overrunable test vehicle.
Figure 6:
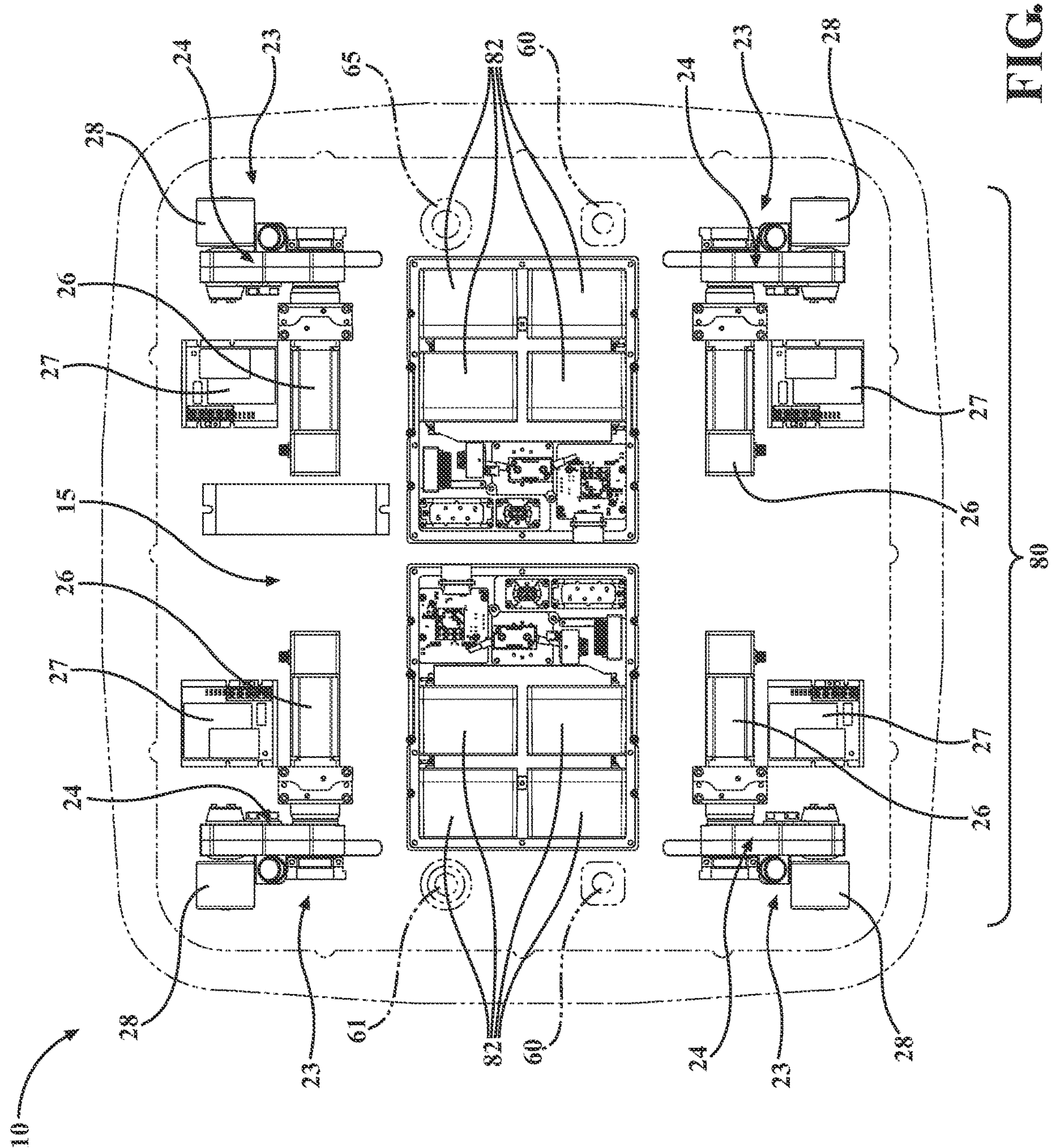
FIG. 6 is a schematic top view of the overrunable test vehicle with the top surface hidden.
Figure 7:
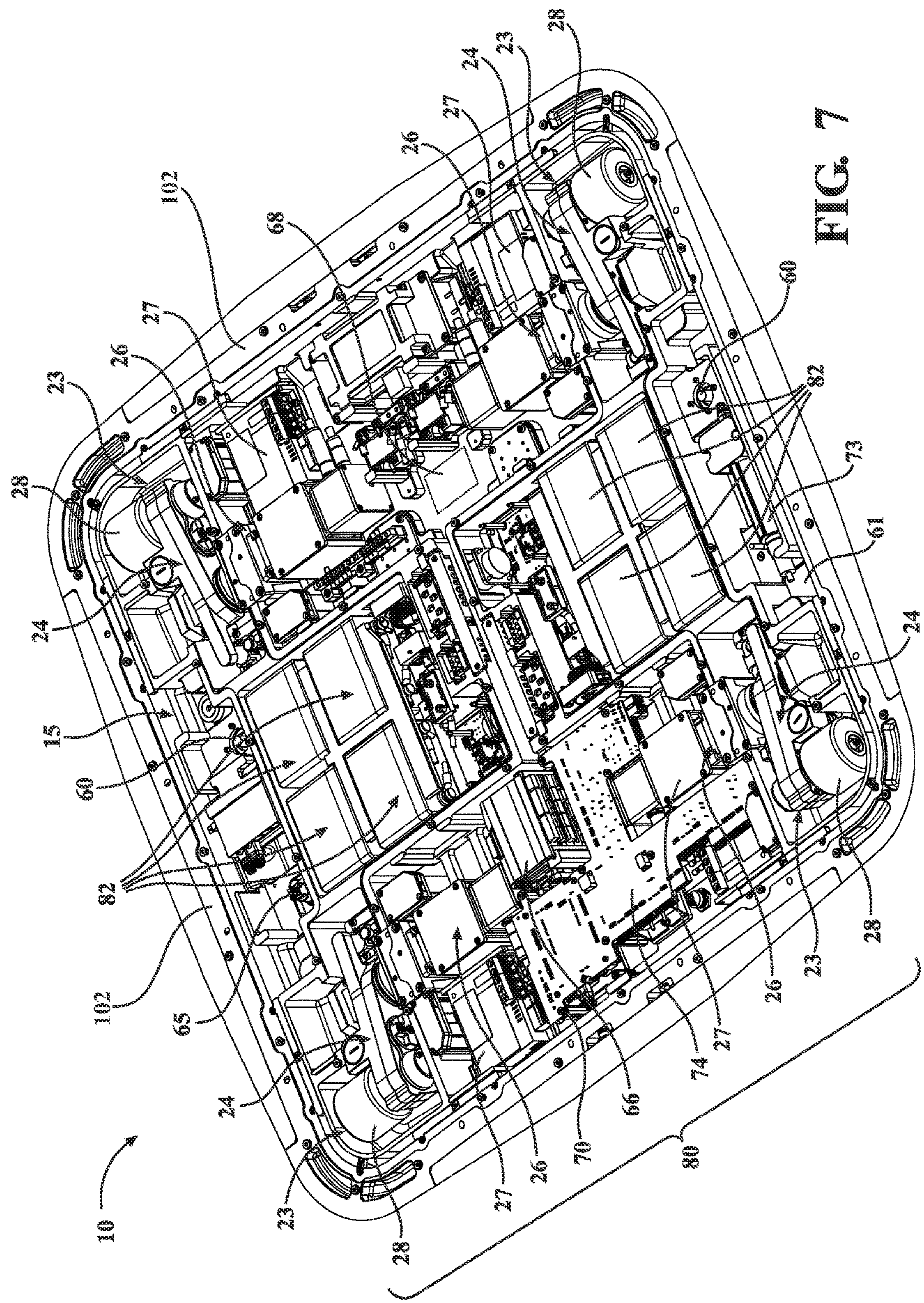
FIG. 7 is a bottom view of one example of a control section of the test vehicle.

The chassis 12 defines an interior cavity 15, such as shown in FIGS. 6 and 7. The interior cavity 15 is an open space for mounting and positioning the different components of the OTV 10, such as the drive mechanisms 23, control system(s) 80, batteries 82, a plurality of sensors, antennas, receivers, or a combination thereof. The cavity 15 of the chassis 12 may be covered with a bottom cover 100 (seen in FIG. 5), battery covers 62, and/or a plurality of other covers or shields for protecting the components of the OTV 10 from being destroyed during testing.

The interior cavity 15 of chassis 12 may be divided into separate compartments to house the different systems and components of the OTV 10. The compartments may function to separate mechanical systems, electrical systems, power systems, sensors, wheels, or a combination thereof from each other. The compartments may be sealed or unsealed. The compartments may be watertight. The chassis 12 may have a generally geometric shape such as rectangular, square, circular, triangular, polygonal or the like. The chassis 12 may include two or more, three or more, four or more, eight or more, or even ten or more compartments. For example, the chassis 12 may be segmented into a plurality of compartments, separating the control system(s) 80 from the transaxles 24. In some examples, each transaxle 24 is the only compartment of the interior cavity 15 of the chassis 12 to be open, with the control system 80, batteries 82, sensors, and electric motors 26 shielded behind one or more covers.

In some examples, the OTV 10 has four electric motors 26, each of the electric motors 26 may be in a separate chamber of the compartment.

FIG. 5 illustrates a bottom view of the OTV 10 with bottom cover 100. The chassis 12 includes the removable bottom cover 100 for sealing and protecting a substantial portion of the components within the interior cavity 15 of the OTV 10. The bottom cover 100 may be made of steel, composite material, plastic, or a combination thereof. The bottom cover 100 may cover portions of the frame 12 which are hollow and house at least a portion of the control system 80, propulsion systems/drivetrain 23, sensors, or a combination thereof. Bottom cover 100 is connected to the frame 12 with a series of fasteners. Bottom cover 100 is connected to the frame 12 with a series of fasteners along the seal 102. The seal 102 keeps the components within the frame 12 from being affected by road debris, fluid, or any other potential hazardous material which a test vehicle 10 may encounter during normal operation. The bottom cover 100 may include a plurality of pockets 50 configured to allow each of the drive mechanisms 23 to protrude from the interior cavity 15 to extend below the bottom cover 100 and contact the driving plane 106. As shown in FIG. 5, the pockets 50 have a L-shape which allow the drive mechanisms 24 to move with changes in the driving surface (also referred to as driving plane 106) relative to the bottom cover 100.

Briefly referring back to FIGS. 2-4, the OTV 10 includes a plurality of sidewalls 22. The chassis 12 may be connected with the plurality of sidewalls 22 configured as ramping portions of the chassis 12. The plurality of sidewalls 22 may function to assist a vehicle 90 with Advanced Driver Assistant Systems (ADAS) technology run over the test vehicle 10 by allowing the tires of vehicle 90 to climb over the test vehicle 10. The chassis 12 may include one or more, two or more, three or more, four or more, six or more, eight or more, ten or more sidewalls 22. The sidewalls 22 may be permanently connected with the chassis 12. The sidewalls 22 may be removably connected with the chassis 12. The test vehicle 10 may include at least one sidewall 22 for each side or portion of the test vehicle 10 so that the test vehicle may be easily overrun on any side.

Turning back to FIGS. 6 and 7, the OTV 10 includes a plurality of drive mechanisms 23. The drive mechanisms 23 are configured to accelerate and decelerate the OTV 10. The drive mechanisms 23 are located within the interior cavity 15 of the OTV 10. Each drive mechanism 23 comprises a transaxle 24 including an electric motor 26 and a drive wheel 28. In the examples provided in this disclosure, the OTV 10 includes four drive mechanisms 23. The OTV is capable of speeds of over 100 kph or more. The speed at which the OTV 10 may travel is dependent on the load carried by the OTV 10, which, in most cases, will be a soft target 92. The drive mechanisms 23 may be configured to accelerate the OTV 10 at a rate 0.1 m/s2 and 5.0 m/s2 or more. The drive mechanisms 23 may be configured to assist the OTV 10 in decelerating and stopping at a rate ranging between −0.1 m/s2 and −5.0 m/s2 or more. In some examples, the rate of acceleration and deceleration is weight dependent. In one example, the OTV 10 is capable of accelerating at a rate of 2.0 m/s2 and decelerate at a rate of −2.0 m/s2 with a payload of 10 kg. Acceleration and deceleration are affected by the weight of the payload on the OTV 10 resulting in slower acceleration and deceleration when the weight of the soft target 92 is increased.

Figure 9:
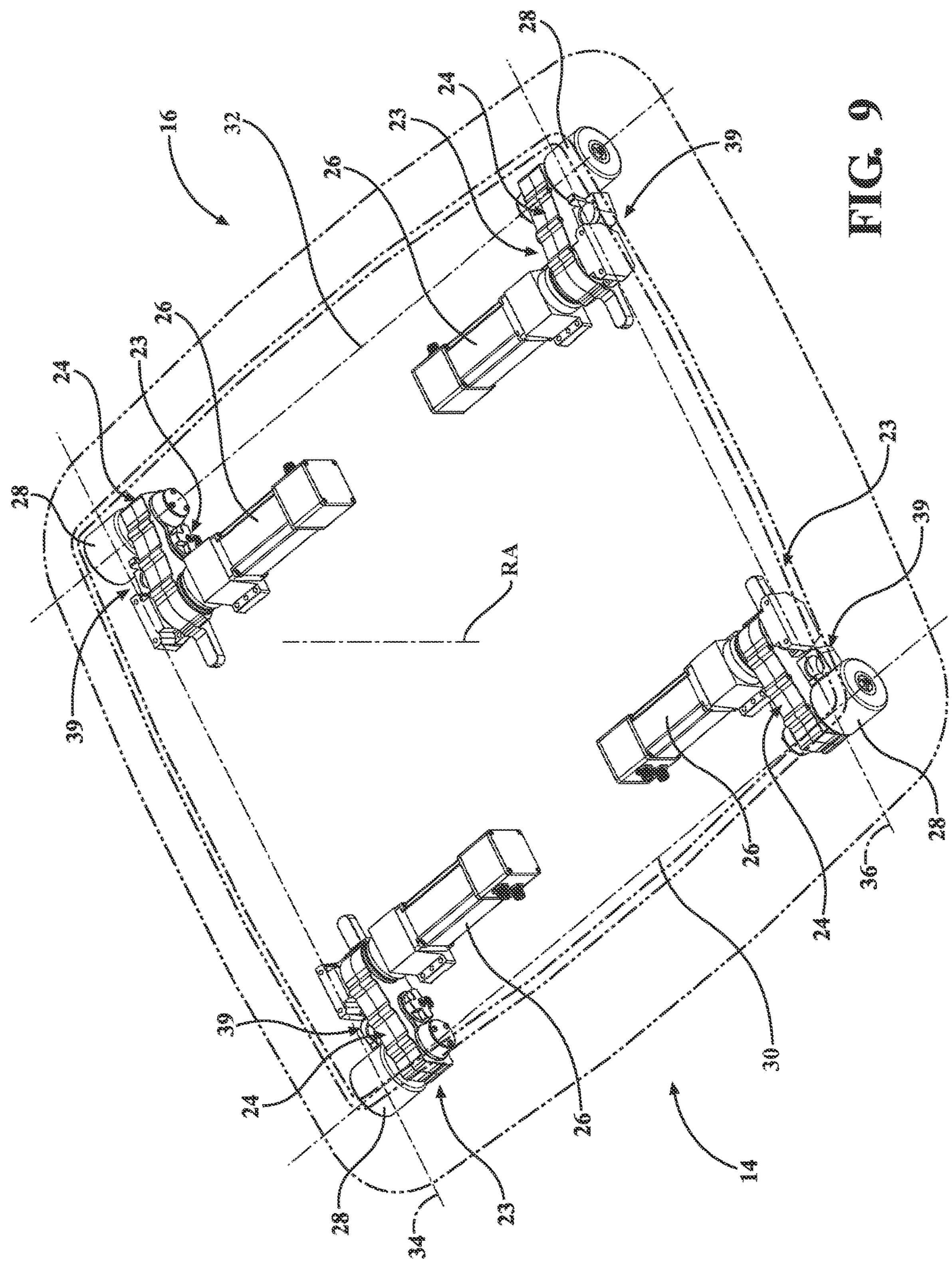
FIG. 9 is a schematic perspective view of the overrunable test vehicle.

Turning to FIG. 9, the OTV 10 includes a first section 14 and a second section 16. In some examples, the first section 14 may be the front portion or the back portion of the OTV 10 and the second section 16 may be the other of the front portion or the back portion of the OTV 10. For purposes of the present disclosure, the first section 14 will refer to the “front” of the OTV 10 and the second section 16 will refer to the “back” of the OTV 10. Similarly, the OTV 10 may be referred as having two sides 34, 36 comprising a first side 34 and a second side 36. In some examples, the first side 34 may be the right side of the OTV 10 or the left side of the OTV 10, and the second side 36 is the other of the right side or the left side of the OTV 10. For purposes of the present disclosure, the first side 34 will be used to refer to the “right” side of the OTV 10 and the second side 36 will be used to refer to the “left” side of the OTV 10. In the present example, the OTV 10 may have two drive mechanisms 23 in the first section 14 and two drive mechanisms in the second section 16 forming axle arrangements 30, 32, as seen in FIG. 9.

An axle arrangement 30, 32 comprises two drive mechanisms 23 in each of the first section 14 and second section 16 of the OTV 10. The axle arrangements 30, 32 are arranged such that each of the drive wheels 28 of the two drive mechanisms 23 of the same section 14, 16 are aligned. In some examples, such as illustrated in FIG. 9, the first axle arrangement 30 includes two drive mechanisms 23 in the first section 14, and the second axle arrangement 32 includes the two drive mechanisms in the second section 16. Each of the first axle arrangement 30 and the second axle arrangement 32 are shown with their respective drive wheels 28 aligned in FIGS. 9-11. Each drive mechanism 23 is attached to the chassis 12 such that the drive wheels 28 are held in a fixed alignment. In the present example, since each of the drive wheels 28 and drive mechanisms 23 are in fixed alignment, no traditional steering mechanism is present in the OTV 10 (e.g. rack and pinion steering mechanism or the like). Rather, the control system 80 utilizes the separate electric motors 26 to create a torque vector to turn the OTV 10 to the desired trajectory, which is described further below.

Each of the drive mechanisms 23 include an electric motor 26. The electric motors 26 may function to provide propulsion to the OTV 10. The electric motors 26 may function to assist in slowing down or stopping the OTV 10. As seen in FIGS. 6-7, the OTV 10 includes four motors 26. Each electric motor 26 includes a motor housing and an output shaft. Each of the electric motors 26 may be independently powered and controlled. The electric motors 26 may be controlled separately by the control system 80. In other examples, each electric motor 26 includes a motor controller 27. In some examples, the motor controller 27 may function to determine and communicate one or more motor parameters between each of the electric motors 26 and the control system 80. In the present example, the electric motors 26 may function as a steering system. For example, as described further below, the electric motors 26 may be operatively connected with the transaxle 24 and control the steering of the OTV 10 by increasing and decreasing power output and direction of rotation of the drive wheels 28 through each transaxle 24. The placement of the transaxles 24 allow the OTV 10 to turn 360 degrees with a turning radius of 6 meters or less. The electric motors 26 are part of the drive mechanisms 23 and connected with the transaxle 24, a suspension system, one or more power supplies (i.e. batteries 82), the drive wheels 28, or a combination thereof.

The drive mechanisms each include a transaxle 24 connecting the electric motor 26 with the drive wheel 28. The one or more motors 26 power the drive mechanism 23. The drive mechanism 23 includes transaxle 24. The transaxle 24 may function to translate rotational movement from the output of each electric motor 26 into rotational movement of drive wheels 28 at a location away from the output shaft of the electric motors 26. In some examples, the transaxle 24 may be a chain drive connecting the output of the electric motors 26 to drive wheel 38. The chain drive may function to transfer rotational movement from an output shaft of the electric motor 26 to power a wheel 38. Each transaxle 24 may include at least one means of transmission between the electric motor 26 output and the drive wheel 28. The transaxle 24 may include at least one chain, belt, band, the like, or a combination thereof for transferring rotational motion from the electric motor 26 to the drive wheel 28.

Each drive mechanism 23 includes one drive wheel 28 per transaxle 24. The drive wheels 28 may function to move the OTV 10 over a surface. As seen in FIGS. 5-7 and 9, the chassis 12 is coupled with four drive wheels 28, one on each transaxle 24. Each of the drive wheels 28 may include a tire wrapped around its circumference. In some examples, the drive wheel may integrate the tire such that the wheel and the tire are unitary. The tires may function to provide traction on a surface. The tires may be made natural rubber, synthetic rubber, plastic, fabric, steel, polymers, or a combination thereof. The tires may be inflatable. The tires may be an airless design. The tires may be solid. The tires may be deformable. The tires may be a disposable item that may be replaced when worn out.

The transaxle 24 is integrated with and is a part of a suspension system 39. Turning to FIGS. 6-7 and FIGS. 8A to 8D, the suspension system 39 may function to allow relative movement between the frame 12 and the discrepancies of the road as contacted by the wheels 28, provide damping as the OTV 10 maneuvers over a surface. The suspension system 39 comprises the drive mechanism 23 and one or more dampers 40, with at least a portion of the drive mechanism 23 and the damper 40 each interacting with the chassis 12 of the OTV 10, directly or indirectly. The suspension system 39 and transaxle 24 can be seen in FIGS. 8A-8D. The suspension system 39 may function to absorb some of the shock of being run over during a test, minimizing damage sustained to the OTV 10. The suspension system 39 may include one or more absorbers and/or dampers 40. The one or more absorbers 40 may be shocks, struts, springs, or any other suitable damping device. The one or more suspension system 39 may be operatively connected with drive wheels 28, the electric motors 26, the chassis 12, or a combination thereof. For example, dampers 40 are connected with each of the transaxles 24, so that when the OTV 10 rides over a change in the driving surface, the drive wheels 28 remain planted on the driving surface. In some examples, the suspension system 39 is configured to be movable into the frame 12 when the OTV 10 is ran over, allowing the frame 12 to take the impact of being driven over, such that the bottom surface of the frame 12 contacts the ground to take the load of the vehicle driving over the OTV.

In order to service the drivetrain 23 of the OTV 10, the transaxles 24 may be moved from an operating position 46 to a service position 48. The operating position 46 is the position which the transaxle 24 is in when operating. As can be seen in FIGS. 8A-8C, the operating position 46 is the range of motion the transaxle 24 may travel during operation. To maintain the operating position 46, an adjustable stop 44 interacts with an extension 42 projecting from the transaxle 24. The adjustable stop 44 can be set to limit the amount of travel the transaxle 24 and suspension system 39 may travel. The adjustable stops 44 may be configured to set a nominal ground clearance of the chassis 12. The stop 44 contacts the extension 42 when the transaxle 24 reaches a maximum amount of travel. The maximum amount of travel is adjustable. The service position 48 is seen in FIG. 8D. To place the OTV 10 into the service position, the adjustable stop 44 may be removed or adjusted to allow the transaxle 24 to be brought out of the frame 12 so that service may be performed on the wheel 38, transaxle 24, chain/belt, sprocket, output shaft of the motor 26, or a combination thereof.

The OTV 10 includes one or more batteries 82. The one or more batteries 82 may function to provide power to test vehicle 10. The test vehicle 10 may have one or more, two or more, three or more, four or more, or even a plurality of batteries 82. The one or more batteries 82 may be removably connected with the test vehicle 10. The one or more batteries are connected with a power controller. In some examples, the one or more batteries are integrated with the power controller. In some examples, there is one power controller for each battery. In other examples, the power controller and the one or more batteries are separate. The one or more batteries may provide the OTV 10 with one or more hours, two or more hours, three or more hours, or even four or more hours of operation. In some examples, the one or more batteries may provide two hours of use, performing 20 or more tests while the OTV 10 is fully loaded. The one or more batteries 82 may power the motors 26 to move the OTV 10 to 100 or more kph. The one or more batteries may power the motors 26 to provide constant speed for an extended period of time while testing. The one or more batteries 82 may swappable so that a user may quickly change to a charged battery to resume testing. The one or more batteries 82 may charge in two or less hours, one or less hours, or even half an hour or less. The one or more batteries may be located in one or more compartments of the OTV 10. The one or more batteries 82 may be flush with the top surface 99 of the test vehicle 10 when installed in the test vehicle. In some examples, as seen in FIG. 5, the battery is stored within the chassis 12 and a battery cover 62 is disposed on the top surface of the OTV 10, concealing and sealing the one or more batteries 82. The battery cover 62 may be configured to "hot swap" the one or more batteries 82, meaning that the cover is configured to be unattached quickly so that the one or more batteries 82 that have been exhausted can be changed for a charged battery. The battery cover 62 may include a plurality of magnets and integrated quick-disconnect screws for connecting to the chassis 12.

Referring back to FIGS. 6 and 7, the control system 80 is housed within the interior cavity 15 of the chassis 12 of the OTV 10. The control system includes a plurality of controllers, a plurality of sensors, or both working in unison and/or independently. As can best be seen in FIGS. 6 and 7, The control system 80 may include a control board 74, a safety controller 66, inertial measurement unit 68, steering controller 70, an onboard WiFi module 73, global navigation satellite system (GNSS) antennas 60, maintenance port 65, motors 26, or a combination thereof. The control system 80 may also include a plurality of sensors such as a ground speed sensor, an inertial sensor, a force sensor, the like, or a combination thereof. The plurality of sensors may be located within the one or more of the controllers 74, 66, 68, 70, 27, of the control system 80. The control system 80 may receive data from the plurality of sensors and controllers (e.g. ground speed sensor, GNSS antenna 60, motor 26, external controllers). The control system 80 may calculate the optimum acceleration parameters, deceleration parameters, or both based on the data received from the plurality of sensors. The control system 80 may utilize an algorithm which optimizes acceleration and deceleration without causing unnecessary or undesirable conditions.

The OTV includes a control system 80 which may include a plurality of controllers, a plurality of sensors, or both working in unison and/or independently. In some examples, the control system may include one or more on-board controllers, and one or more remote controllers. In some examples, the one or more on-board controllers may work in conjunction with one or more remote controllers. A remote controller may be used to control one or more OTVs 10. As can best be seen in FIGS. 6 and 7, the control system 80 may include a control board 74, a safety controller 66, inertial measurement unit 68, steering controller 70, communications controller 72, an onboard WiFi module 73, GNSS antennas 60, motors 26, or a combination thereof. The control system 80 may also include a plurality of sensors such as a ground speed sensor, an inertial sensor, a force sensor, the like, or a combination thereof.

The safety controller 66 may be used to determine and maintain an appropriate performance level according by calculating an analysis of failure modes and effects, ensuring that the OTV operates as intended. For example, the safety controller 66 prevents unintentional movement and determine appropriate conditions for the OTV 10 to emergency stop.

The inertial measurement unit 68 may function to monitor the speed and acceleration of the OTV 10 using GNSS, ground speed sensors, and inertial sensors, providing the data to the safety controller, the steering controller, the communications controller, or any part of the control system 80 necessary to control the OTV 10.

The GNSS antennas 60, may be used to localize the OTV 10 and track the position of the OTV 10 during a test. In some examples, other forms of localizing the position of the OTV 10 may be used, such as ultraband receivers and beacons.

The maintenance port 65 may be used to connect external equipment to the OTV 10 to gather data, adjust settings, or perform routine maintenance. The maintenance port 65 may be powered and may additionally function to provide a power source to a soft target 92. For example, a soft target 92 may be configured as a vehicle with headlights and taillights, and may be connected through a cable to the OTV 10 to provide power to the soft target 92, enabling the realistic light conditions on the soft target 92.

The steering controller 70 may function to control the steering of the OTV 10 through an algorithm based on speed, acceleration, power levels, location, and other attributes of the OTV 10 during operation. The communications controller may function to link the control system and any other external controllers together, serving as an on-board local area network. The communications controller is connected with the WiFi module 73 and WiFi antenna 61. In some examples, the WiFi antenna 61 may extend out of the frame 12 past the outer surface 99 to provide better connectivity and is configured to withstand being overrun. The WiFi antenna may be removably connected. The WiFi antenna 61 may be a disposable part.

The control system 80 is connected with the one or more motors 26, the one or more motor controllers 27, one or more remote controllers, or a combination thereof. The control system 80 may include the one or more motors, one or more motor controllers 27, or both. The control system 80 may send messages and/or commands relating to one or more motor parameters to the motor controller 27 which controls the actuation of the motor 26. Motor parameters are one or more outputs of the motor which can be commanded by the motor controller 27, the control system 80, or both. The motor parameters may include a motor speed, a motor torque, or both. The one or more motor parameters may be executed by delivering a specific electric current to the one or more motors 26. The amount of current applied to each electric motor 26 corresponds with an output torque which is then applied to the drive wheel 28. The amount of current applied to each electric motor 26 may correspond with a set RPM of the output of the electric motors 26. The control system 80 calculates and commands the current to the electric motors 26 required to achieve a designated wheel speed of the drive wheels 28, and, ultimately, the ground speed of the OTV 10. The motor controller 27 may communicate with the control system 80 through a controller area network (CAN) which sends data through the control system 80, controlling the operation of the OTV 10. For example, when a deceleration is commanded by the control system 80, the one or more electric motors 26 may receive a CAN command to slow the OTV 10 down to a desired rate by adjusting the motor speed, motor torque, or both. The control system 80 may function to control the amount of braking force used by the OTV 10 to decelerate and stop. The control system 80 may work in conjunction with the motor controller 27 to control the one or more motor parameters to slow down or stop the OTV 10 at a particular deceleration.

The control system 80 may receive data from the plurality of sensors and controllers (e.g. ground speed sensor, GNSS antenna 60, motor 26, external controllers). For example, the ground speed sensor may function to calculate the speed of the frame 12. The ground speed sensor may be connected with the control system 80 and send the speed measurements, inertial measurements, or both to the controller 80 for processing. The ground speed sensor may be located on or in one or more of the plurality of controllers 66, 68, 70, 74 within the control system 80. The ground speed sensor may work in conjunction with or be a part of the GNSS antenna 60, to ascertain the ground speed of the frame 12. The control system 80 may calculate the optimum acceleration parameters, deceleration parameters, or both based on the data received from the plurality of sensors. The control system 80 may utilize an algorithm which optimizes acceleration and deceleration without causing unnecessary or undesirable conditions. The control system 80 is configured to control the operations of the OTV 10 during a dynamic vehicle test.

Figure 10:
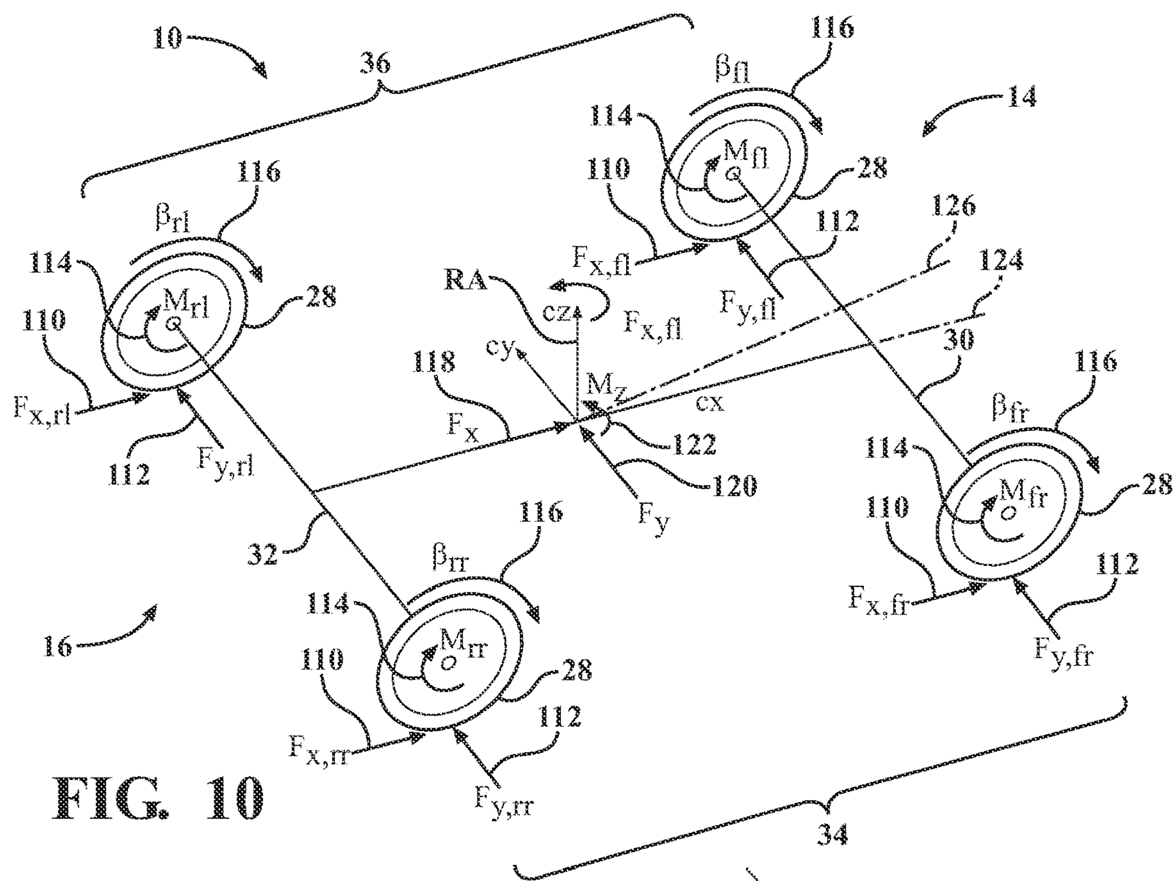
FIG. 10 is a force diagram of an overrunable test vehicle.

As described above, the drive mechanisms 23 operate in conjunction with one another to turn the OTV 10 from a first trajectory 124 to a target trajectory 126 by applying a torque vector onto the OTV 10, turning the OTV 10 about the rotational axis RA. In some examples, the rotational axis RA corresponds with the center of gravity of the OTV 10. FIG. 10 illustrates a force diagram of the OTV 10. During operation, forces 110 in the x-direction and forces 112 in the y-direction are applied on each of the drive wheels 28. Drive wheels 28 have a rotational force (i.e. torque) 114 applied from the axle arrangements 30, 32. The rotational forces 114 are controlled by the control system 80 to adjust wheel speed 116. In some examples, the torque 114 and wheel speed 116 is the same for one drive wheel 28 on the first axle arrangement 30 and one drive wheel 28 located on the second axle arrangement 32 on the same side 34, 36 of the OTV 10. In some examples, both of the drive wheels 28 on the first side 34 may have the same torque and resulting wheel speed, and both of the drive wheels 28 on the second side 36 have the same torque and resulting wheel speed. When the OTV 10 is moving in a straight line, all four drive wheels 28 will have the same torque 114 and wheel speed 116. When the OTV 10 is commanded to turn, one side 34, 36 will have a greater torque 114 and faster wheel speed 116 (corresponding to the drive wheels 28 on the outside of the turn) commanded by the control system 80 and the other side 34, 36 will have a lesser torque 114 and slower wheel speed 116 (corresponding to the drive wheels 28 on the inside of the turn) commanded by the control system 80. In this example, the difference in torque 114 between the first side 34 and the second side 36 will each apply a force 118, 120 onto the OTV 10 causing a rotation 122 about the axis of rotation RA.

As mentioned above, the axis of rotation RA is the location which the OTV 10 will yaw about when the control system 80 commands the OTV 10 to turn. The axis of rotation RA is transverse to the driving plane 106. In this example, the axis of rotation RA corresponds with the center of gravity of the OTV 10. When the OTV 10 is commanded to turn, the difference in torque 114 and wheel speed 116 cause forces in x-direction 118 and forces in the y-direction 120 applied to the chassis 12 to cause a rotational force 122 about the rotational axis RA, forming a torque vector (shown as the target trajectory 126 which is a deviation from the current trajectory 124). The greater the difference in torques between the first side 34 and the second side 36, the bigger the forces 118, 120 applied to the axis of rotation RA, causing a larger rotational force 122. The size of the rotational force 122 applied to the rotational axis RA will determine the angle of rotation of the OTV 10. A larger rotational force 122 will have an output as a greater angle of rotation, causing a larger deviation from the current trajectory 124 to the target trajectory 126.

Figure 11:
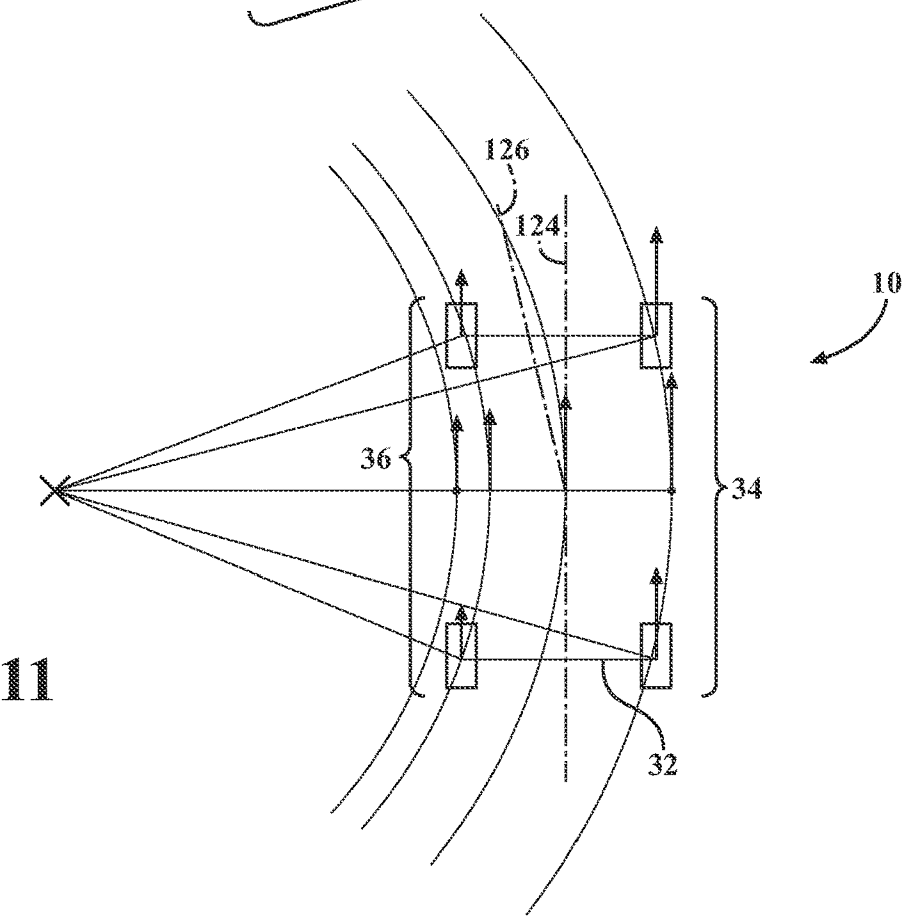
FIG. 11 is a schematic diagram of the overrunable test vehicle turning.

FIG. 11 is a schematic diagram of the overrunable test vehicle turning to the left. As discussed above, a difference in torque between the left side 36 and the right side 34 causes the OTV 10 to rotate. In this example, the force arrows on the left side 36 are smaller than the force arrows on the right side 34. The larger force arrows on the right side 34 indicate that the OTV 10 has a greater torque output and wheel speed on the right side 34, which in this example, is on the outside of the turn. As the OTV 10 is rotating from the current trajectory 124 to the target trajectory 126, the differences in forces applied to the right side 34 and the left side 36 cause a difference in wheel slip. Wheel slip is a ratio of the rotational speed of a wheel affected by a force, such as increasing and decreasing torque, relative to the rotational speed of the wheel unaffected by the force. In the example shown in FIG. 11, the left side 36 of the OTV has a negative wheel slip since the wheel speed is slower on the inside of the turn and the right side 34 has a positive wheel slip since the wheel speed is faster on the outside of the turn.

When the OTV 10 is commanded to turn, the control system 80 of the OTV 10 determines the ground speed of the OTV 10 using GNSS, the ground speed sensor, or both, as the OTV 10 is traveling along the first trajectory 124. The control system 80 determines the necessary first target angle of rotation corresponding to a first target trajectory 126. The control system 80 calculates a wheel slip based on the ground speed required to rotate the OTV 10 from the first trajectory 124 to the target trajectory 126. The control system 80 calculates individual speed and torque outputs for each of the electric motors 26 based on the ground speed required to rotate the OTV 10 from the first trajectory 124 to the target trajectory 126. The OTV 10 is rotated to the first target angle of rotation from the first trajectory by controlling the motor parameters of the four electric motors 26 using the control system 80 to adjust speed and torque of each of the electric motors 26, applying a first torque vector to the overrunable test vehicle 10.

Figure 12:
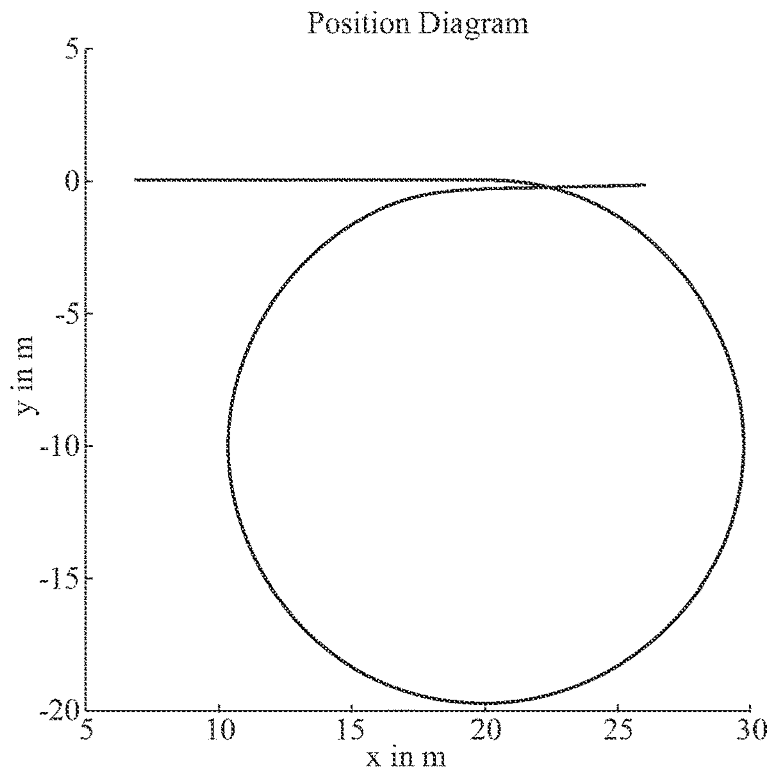
FIG. 12 is one example of a position diagram corresponding to an overrunable test vehicle driving in a circle.
Figure 13:
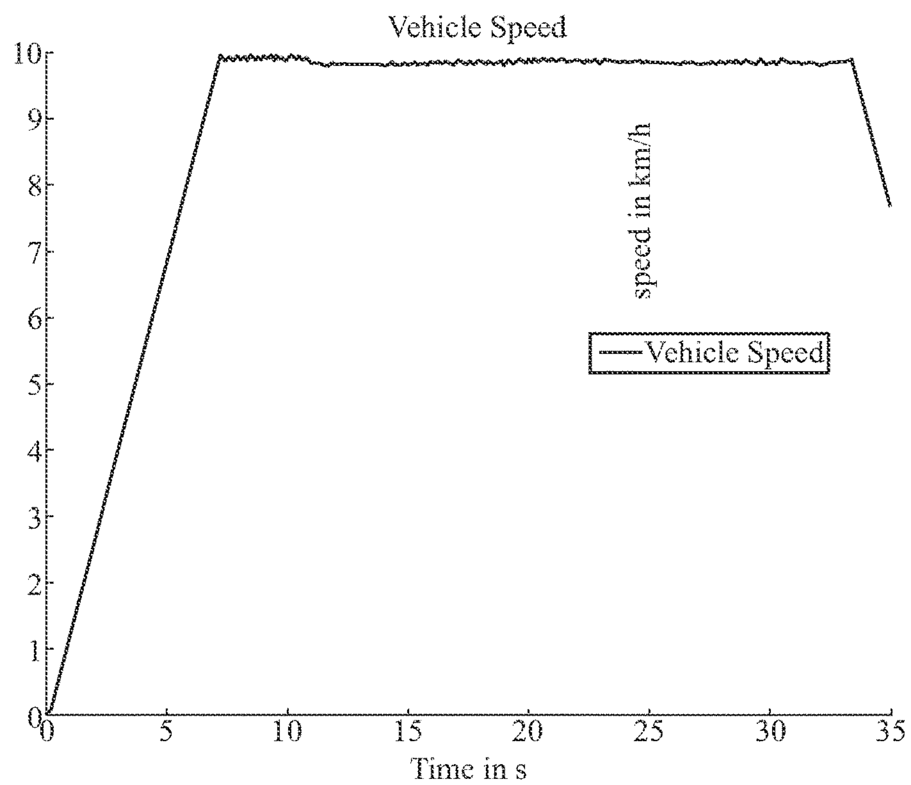
FIG. 13 is one example of a vehicle speed diagram corresponding to an overrunable test vehicle driving in a circle.
Figure 14:
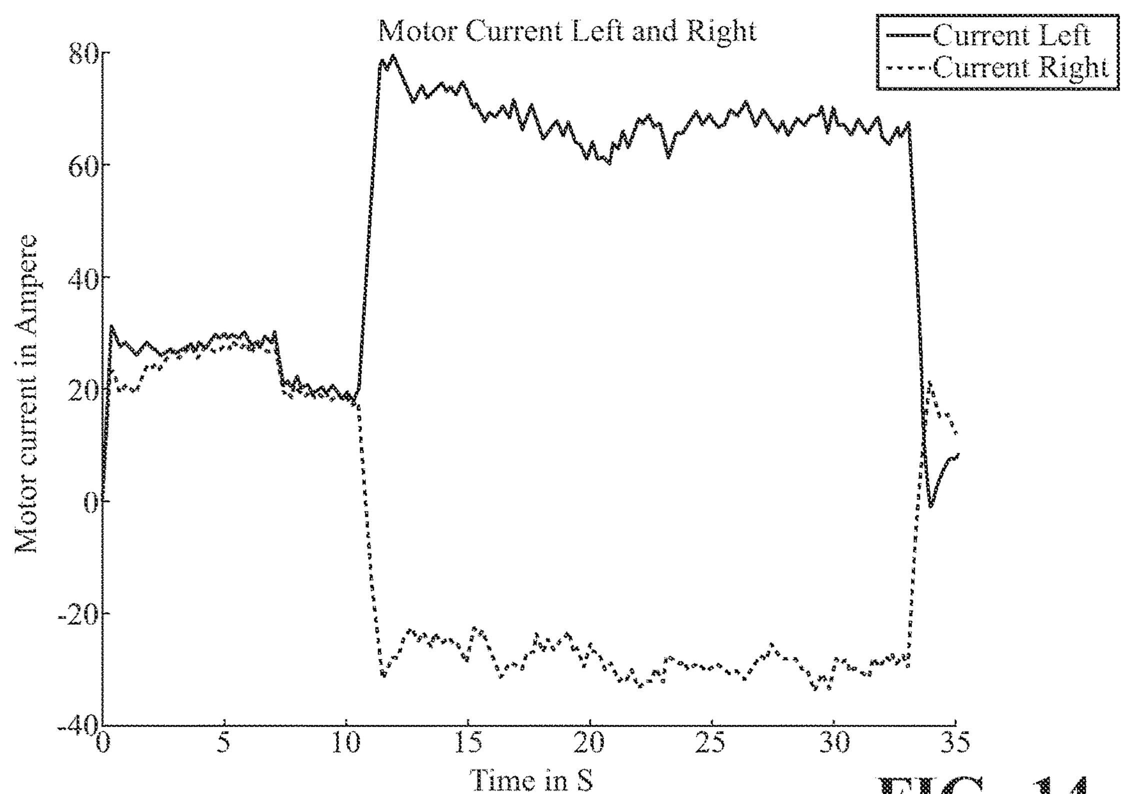
FIG. 14 is one example of a motor current diagram for the left motors and the right motors corresponding to an overrunable test vehicle driving in a circle.
Figure 15:
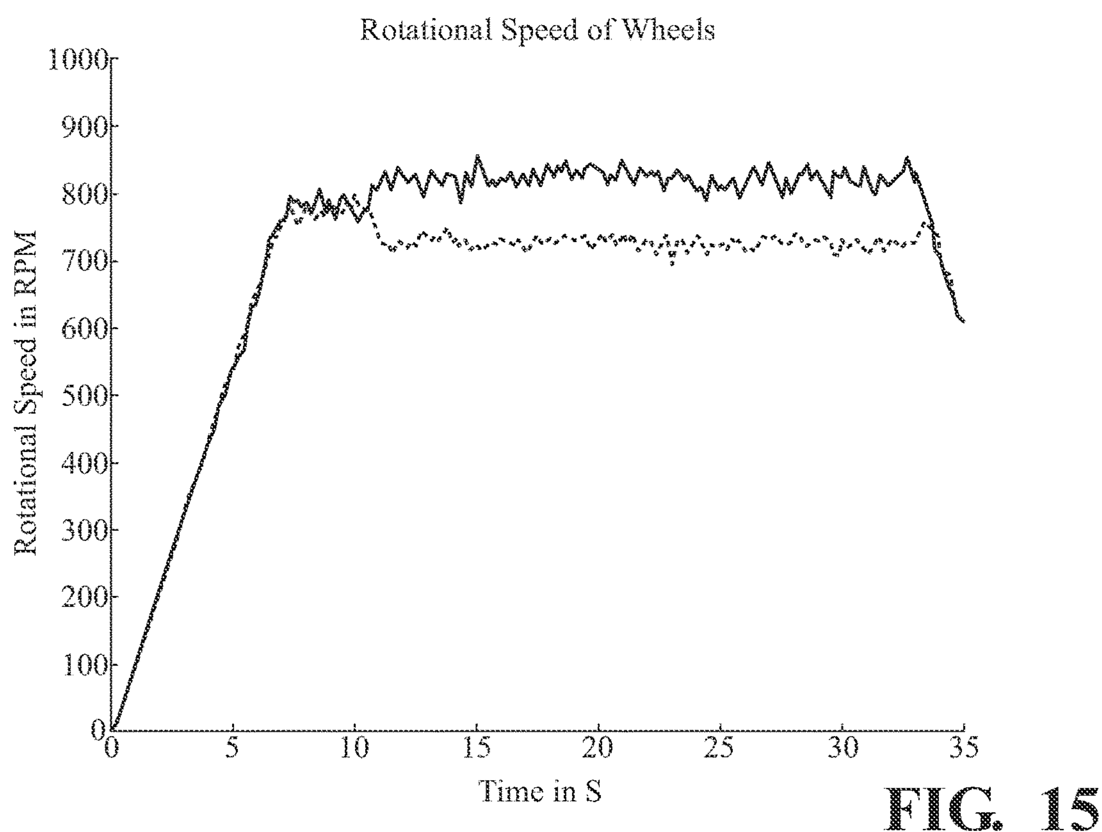
FIG. 15 is one example of a wheel speed diagram corresponding to an overrunable test vehicle driving in a circle.
Figure 16:
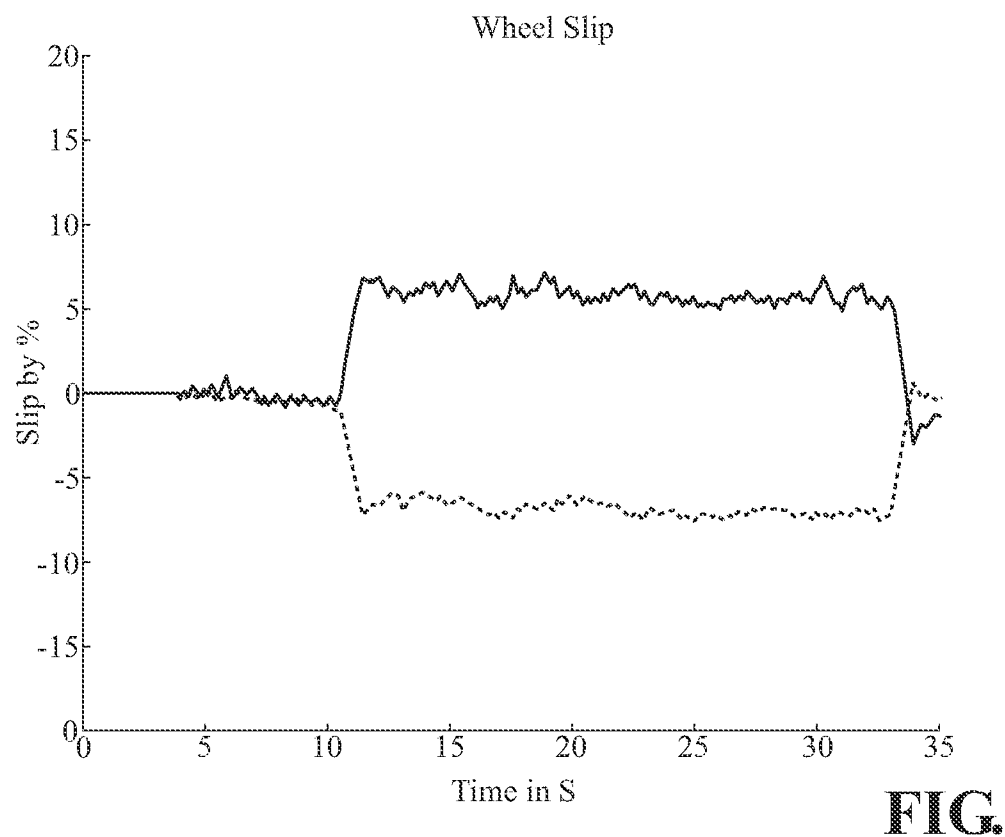
FIG. 16 is one example of a wheel slip diagram for the left side wheels and the right side wheels corresponding to an overrunable test vehicle driving in a circle.

FIG. 12 is one example of a position diagram corresponding to an overrunable test vehicle driving in a circle. In this example, the OTV 10 has a driving path of a circle having a radius of 10 meters. FIG. 13 graphically displays the vehicle speed corresponding to the OTV 10 following the circular path. As can be seen in FIG. 13, the speed of the OTV 10 is ramped up from 0 to about 10 kph for this test which is maintained until the circular path is complete. FIG. 14 graphically illustrates the left and right motor currents corresponding to the OTV 10 driving in a circle. The motor current is measured in amps, with the more amps resulting in more force and speed applied to the drive wheels 28. As the OTV 10 is following the circular path, the left motor commands 40 amps more than the right electric motor, causing the left electric motor (connected with the wheels on the outside of the turn) to increase the rotational output, which can be observed in FIG. 15, which illustrates wheel speed. Similarly, the right electric motor commands less current to decrease rotational output, slowing the wheels on the right side, which is shown in FIG. 15 as having a lower RPM than the left wheels. The graph of FIG. 16 showing wheel slip mirrors the graph of FIG. 14 showing motor currents, since motor current and wheel slip are directly related. As motor current is increased, positive wheel slip is increased, and as motor current is decreased, negative wheel slip is increased.

Figure 17:
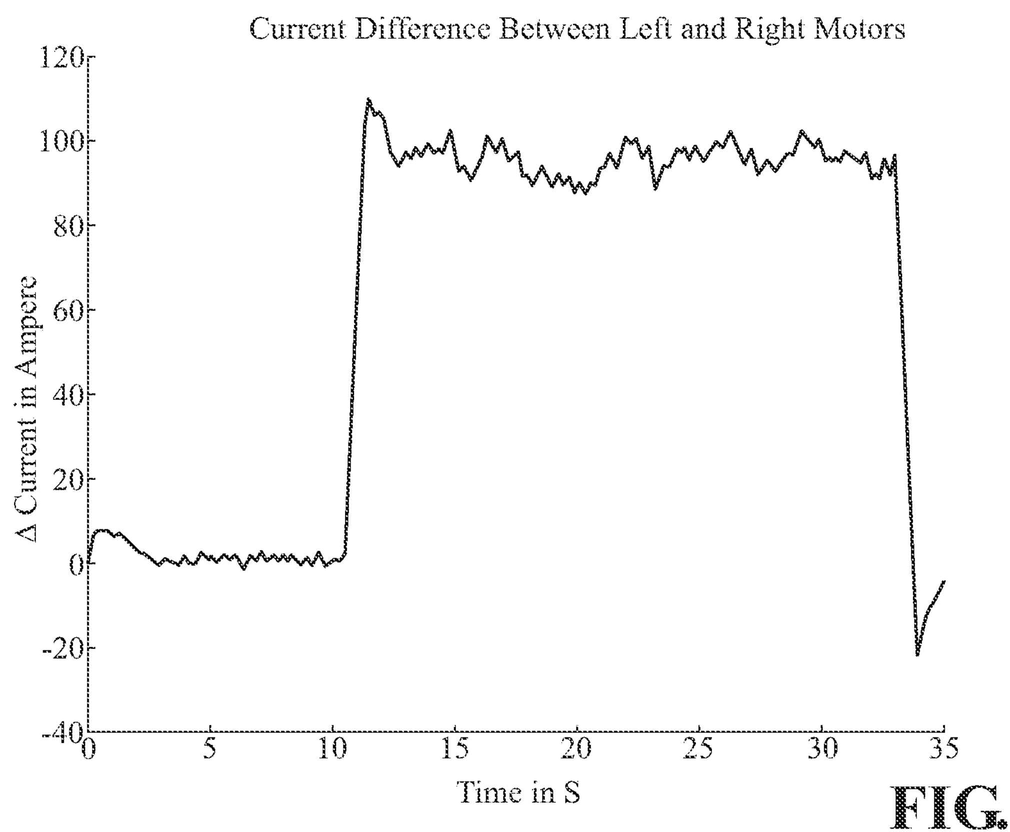
FIG. 17 is one example of a diagram displaying the difference in current between the right side motors and the left side motors corresponding to an overrunable test vehicle driving in a circle.
Figure 18:
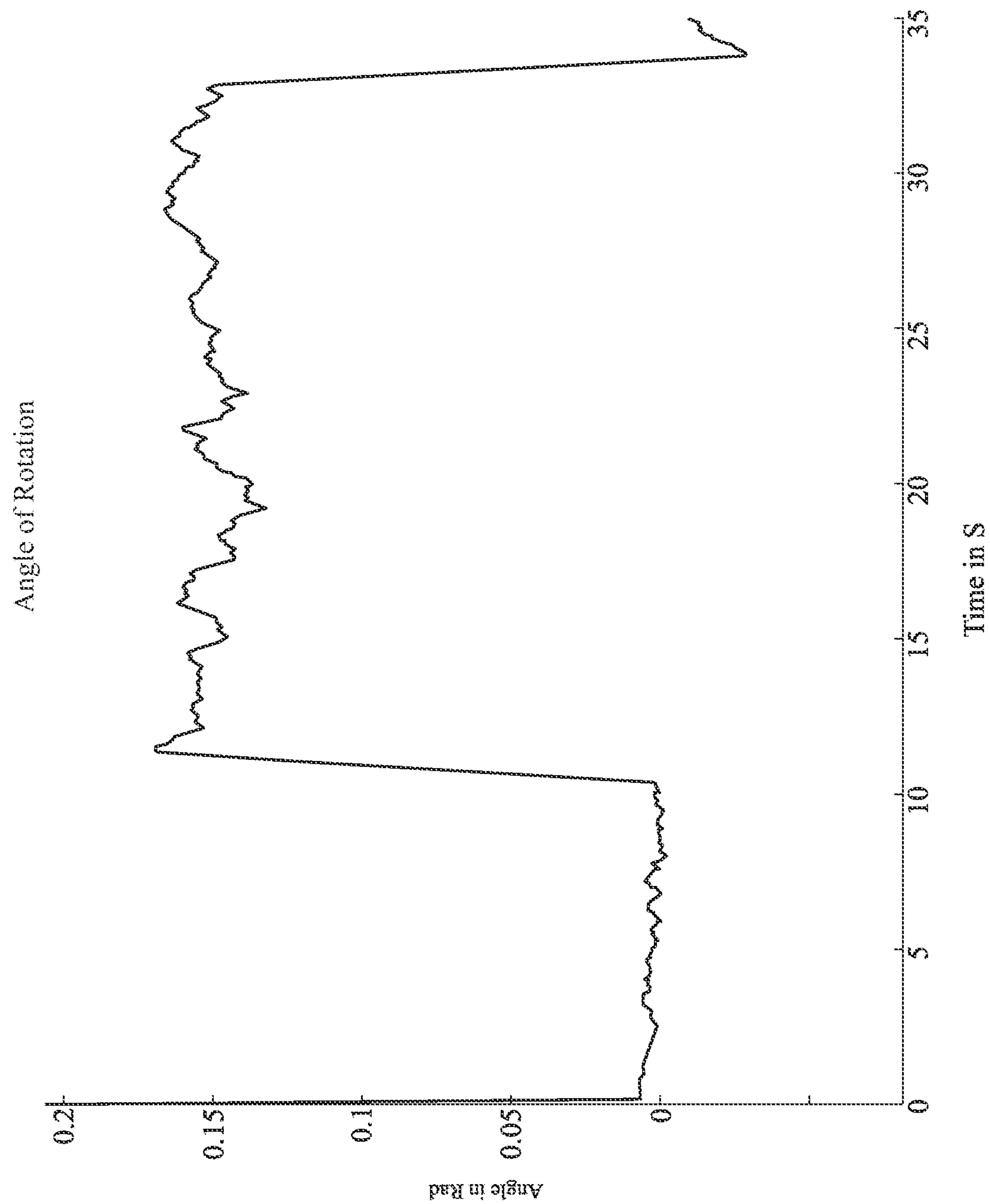
FIG. 18 is one example of an angle of rotation diagram corresponding to an overrunable test vehicle driving in a circle.

FIG. 17 graphically illustrates the difference in current between the right side electric motors and the left side electric motors corresponding to OTV 10 driving in a circle, and FIG. 18 illustrates an angle of rotation of the OTV 10 driving in a circle. The graphs of FIG. 17 and FIG. 18 have a similar plotted line because the difference in current between the left side electric motors and the right side electric motors directly controlling the steering angle of the OTV 10. As explained above, as the motor current is increased to one side of the OTV 10 and decreased to the other side of the OTV 10, the OTV 10 will rotate about the rotational axis RA changing direction from the first trajectory 124 to the target trajectory 126. In this example, the first trajectory 124 and the target trajectory may be recalculated rapidly as the OTV 10 drives the circular path along the driving plane 106.

Figure 19:
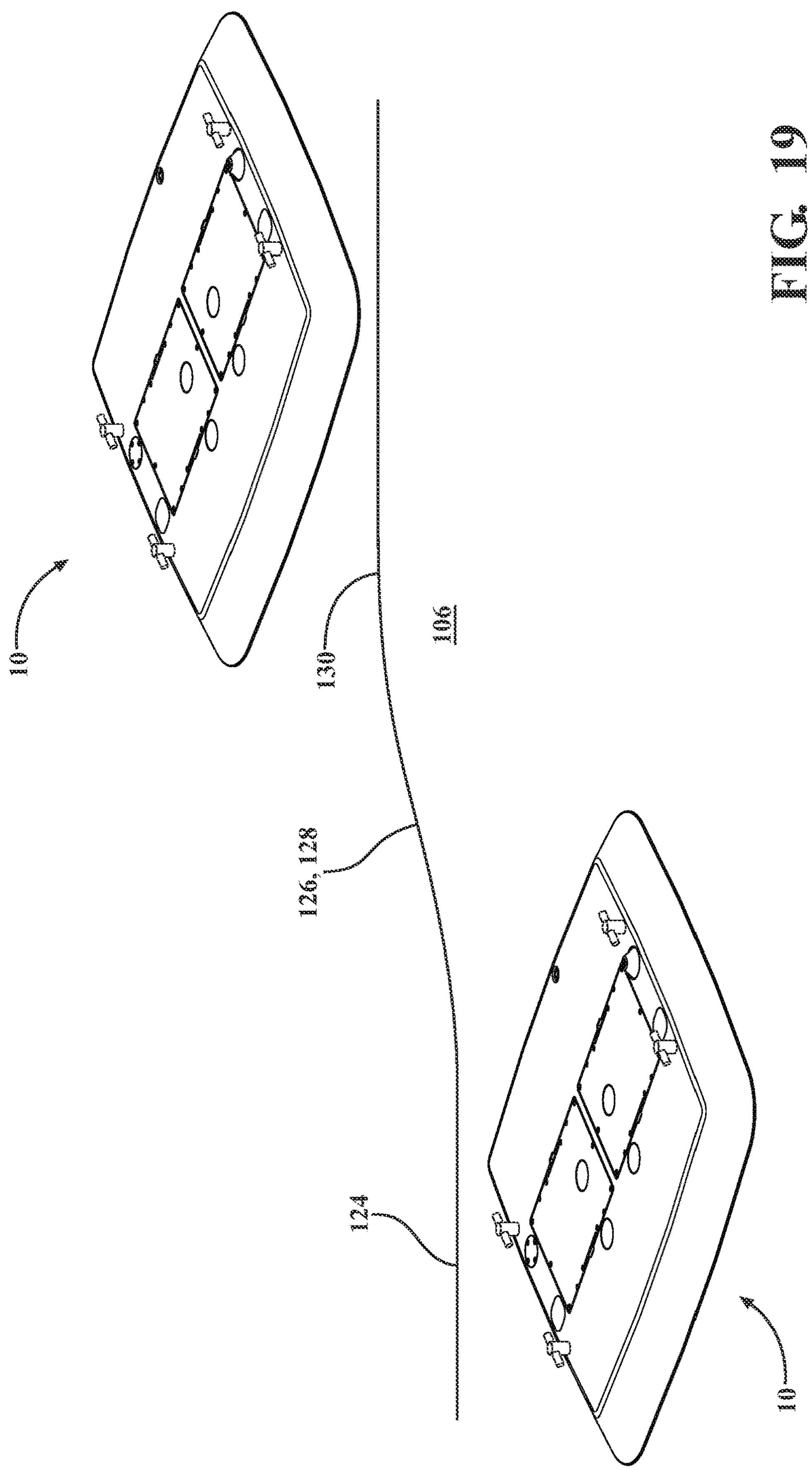
FIG. 19 is a schematic diagram of an overrunable test vehicle performing a lane change.

FIG. 19 illustrates a schematic diagram of OTV 10 performing a lane change. To perform the lane change, the control system of the OTV 10 determines a ground speed of the OTV 10 is traveling along the trajectory 124 as the OTV 10 is commanded to turn. The control system 80 determines the necessary first target angle of rotation corresponding to a first target trajectory 126. The control system 80 calculates a wheel slip based on the ground speed required to rotate the OTV 10 from the first trajectory 124 to the target trajectory 126. The control system 80 calculates individual speed and torque outputs for each of the electric motors 26 based on the ground speed required to rotate the OTV 10 from the first trajectory 124 to the target trajectory 126. The OTV 10 is rotated to the first target angle of rotation from the first trajectory 124 by controlling the motor parameters of the four electric motors 26 using the control system 80 to adjust speed and torque of each of the electric motors 26, applying a first torque vector to the overrunable test vehicle 10. In this example, the left side electric motors are commanded to a negative wheel slip and the right side electric motors are commanded to a positive wheel slip, causing the OTV 10 to be turned left. Once the OTV 10 has been rotated from the first trajectory 124 to the first target trajectory 126, the OTV 10 is on a second trajectory 128. The control system 80 determines a second target angle of rotation of the OTV 10 corresponding with a second target trajectory 130 and calculates the wheel slip based on the ground speed and the individual speed and torque outputs for each of the four electric motors. The OTV 10 is rotated to the second target angle of rotation from the second trajectory 128 by controlling the motor parameters of the four electric motors to adjust speed and torque of each of the electric motors, applying a second torque vector to the OTV 10, rotating the OTV 10 from the second trajectory 128 to the second target trajectory 130.

Figure 20:
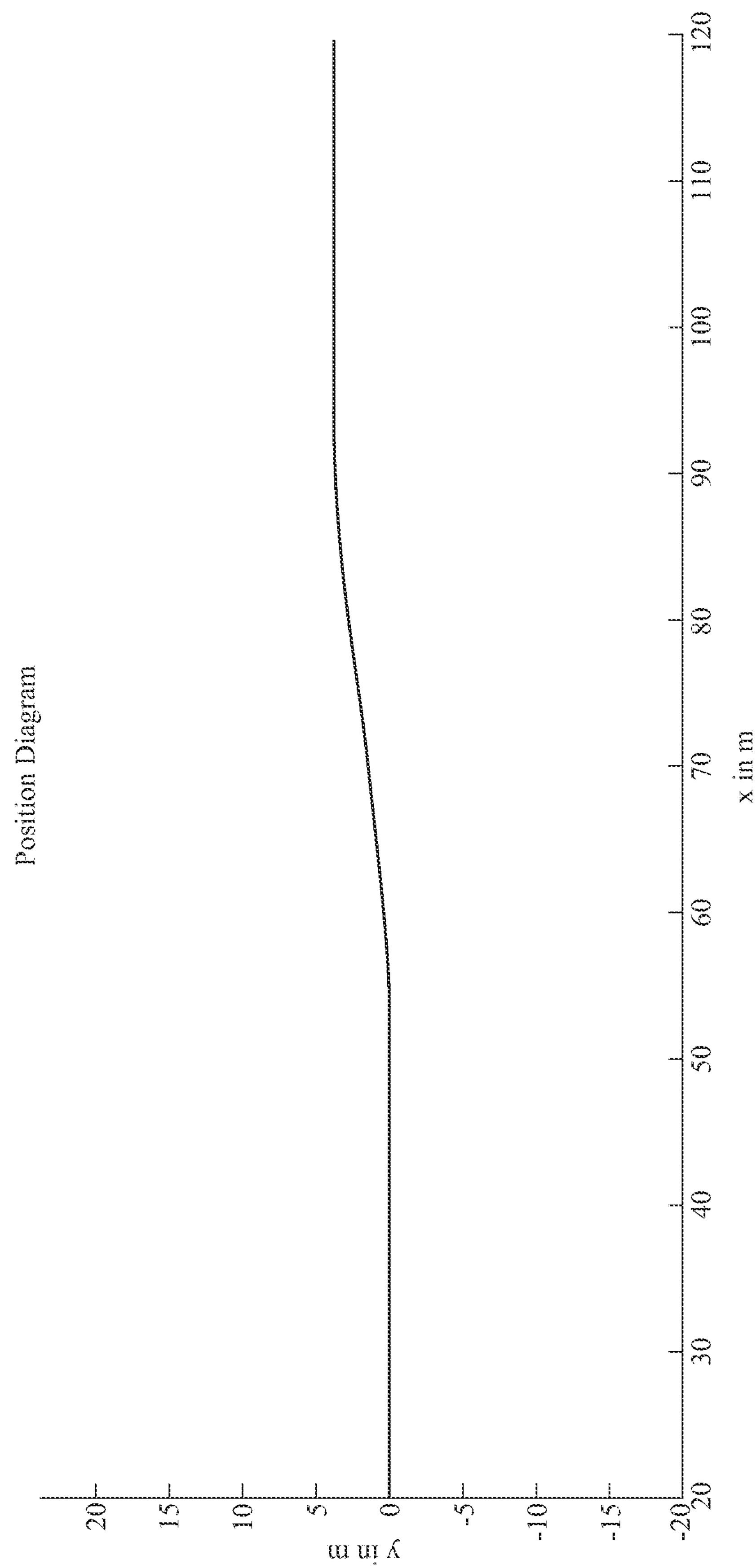
FIG. 20 is one example of a position diagram corresponding to an overrunable test vehicle performing a lane change.
Figures 21, 22:
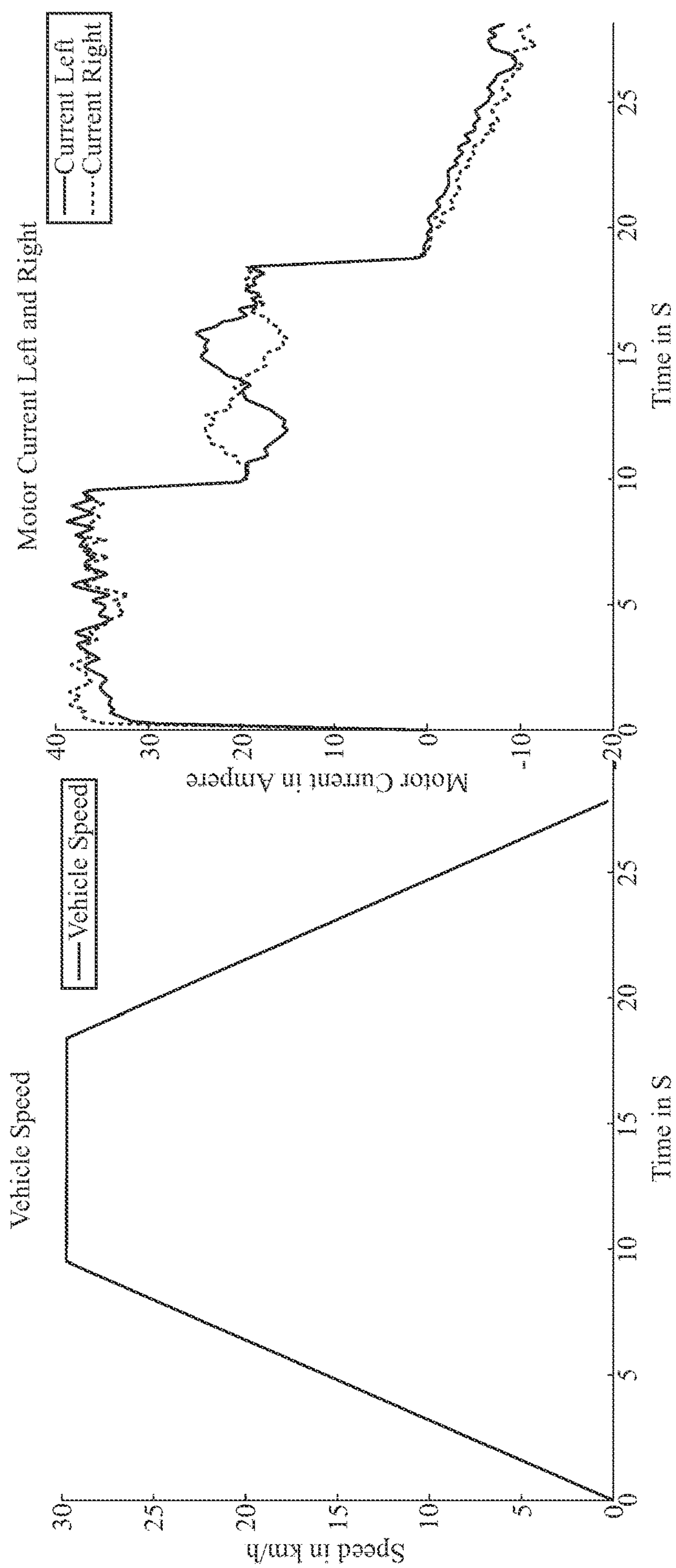
FIG. 21 is one example of a vehicle speed diagram corresponding to an overrunable test vehicle performing a lane change.
FIG. 22 is one example of a motor current diagram for the left motors and the right motors corresponding to an overrunable test vehicle performing a lane change.
Figure 24:
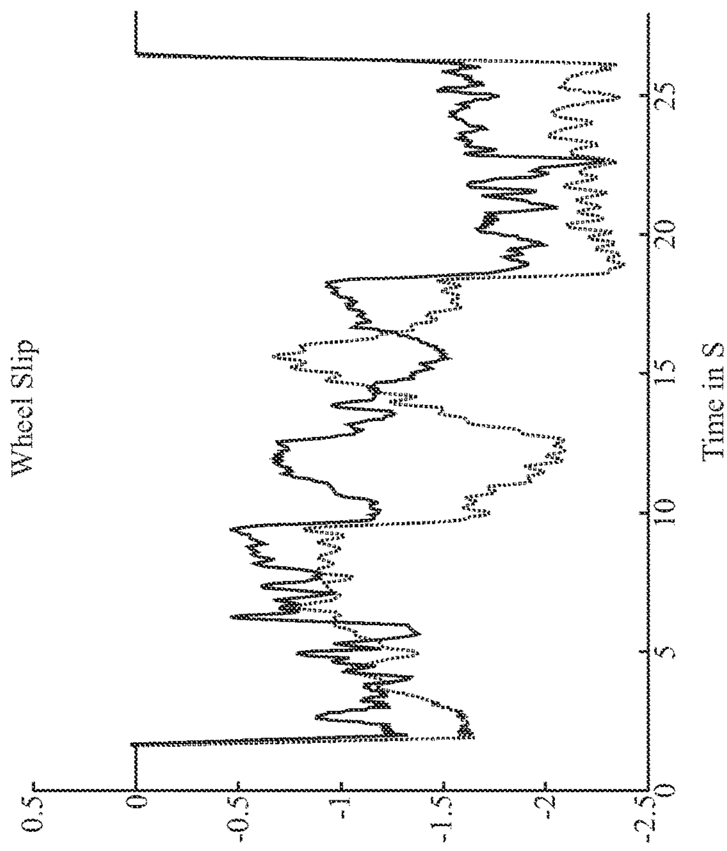
FIG. 24 is one example of a wheel slip diagram for the left side wheels and the right side wheels corresponding to an overrunable test vehicle performing a lane change.
Figure 23:
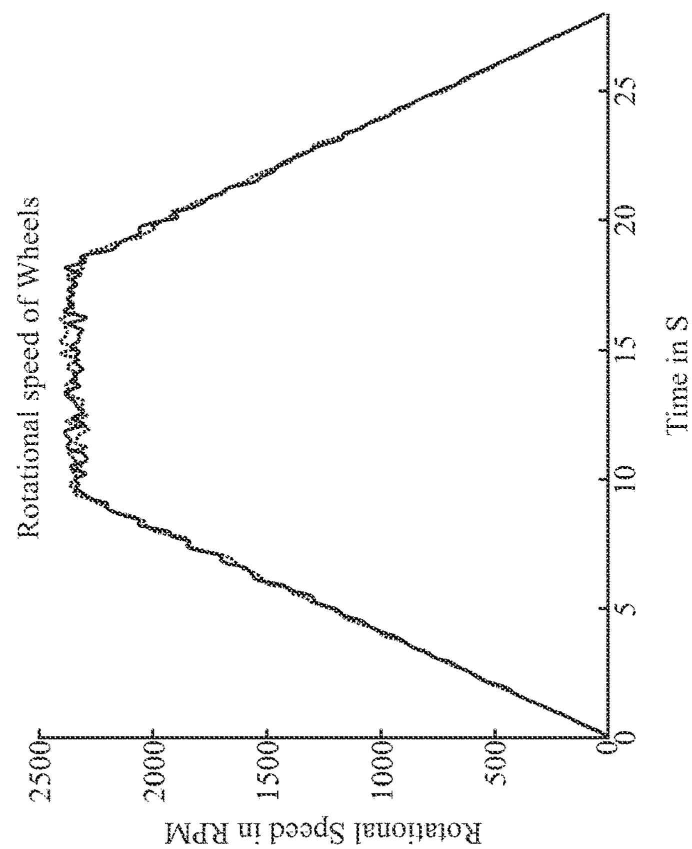
FIG. 23 is one example of a wheel speed diagram corresponding to an overrunable test vehicle performing a lane change.

FIG. 20 is a position diagram corresponding to OTV 10 performing a lane change, similar to FIG. 19. FIG. 21 graphically displays the vehicle speed corresponding to the OTV 10 following the lane change course. As can be seen in the example illustrated in FIG. 21, the speed of the OTV 10 is ramped up from 0 to about 30 kph for the lane change. FIG. 22 graphically illustrates the left and right motor currents corresponding to the OTV 10 performing the lane change. The motor current is measured in amps, with the more amps resulting in more force and speed applied to the drive wheels 28. As the OTV 10 is following the lane change course, the first turn causes the right side electric motors to command approximately 25 amps and the left side electric motors to command 15 amps, causing the right side electric motors (connected with the wheels on the outside of the turn) to increase the rotational output, which can be observed in FIG. 23, which illustrates wheel speed. Similarly, the left side electric motors command less current to decrease rotational output, slowing the wheels on the left side, which is shown in FIG. 23 as having a lower RPM than the left wheels for the first right turn. The second turn in the lane change course illustrates the same results but on the electric motors on the opposite sides. In the second turn of the maneuver, the OTV 10 is rotated to the left, causing the motor currents of the right side electric motors to drop and the motor currents of the left side electric motors to increase, causing the wheel speed of the left wheels to be greater than the wheel speed of the right wheels. The graph of FIG. 24 showing wheel slip similar to the graph of FIG. 22 showing motor currents, since motor current and wheel slip are directly related. As motor current is increased, positive wheel slip is increased, and as motor current is decreased, negative wheel slip is increased.

Figures 25, 26:
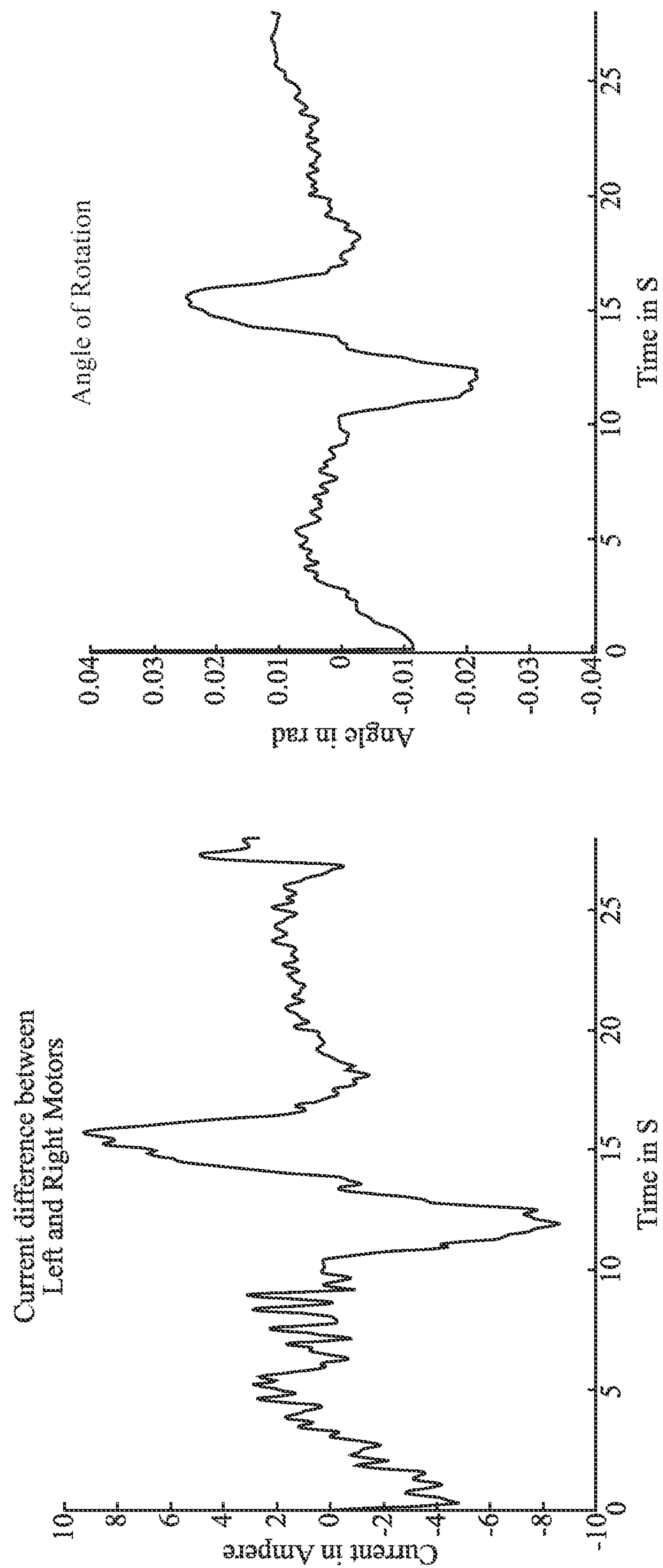
FIG. 25 is one example of a diagram displaying the difference in current between the right side motors and the left side motors corresponding to an overrunable test vehicle performing a lane change.
FIG. 26 is one example of an angle of rotation diagram corresponding to an overrunable test vehicle performing a lane change.

FIG. 25 graphically illustrates the difference in current between the right side electric motors and the left side electric motors corresponding to OTV 10 driving through the lane change, and FIG. 26 illustrates the angle of rotation of the OTV 10 driving in a circle. The graphs of FIG. 25 and FIG. 26 have similar plotted lines because the difference in current between the left motor and the right motor directly affect the angle of rotation of the OTV 10. As explained above, as the motor current is increased to one side of the OTV 10 and decreased to the other side of the OTV 10, the OTV 10 will rotate about the rotational axis RA changing direction from an initial trajectory 124, 128 to the target trajectory 126, 130.

Several examples have been discussed in the foregoing description. However, the examples discussed herein are not intended to be exhaustive or limit the invention to any particular form. The terminology that has been used is intended to be in the nature of words of description rather than of limitation. Many modifications and variations are possible in light of the above teachings and the invention may be practiced otherwise than as specifically described.

What is claimed is:

1. An overrunable test vehicle configured to carry a soft target, the overrunable test vehicle comprising:

a chassis;

a first axle arrangement and a second axle arrangement connected to opposite ends of the chassis, at least one of the first and second axle arrangements comprising:

a first electric motor on a first side of the chassis and a second electric motor on a second side of the chassis, each of the first electric motor and the second electric motor including a drive wheel with the drive wheels held in a fixed alignment relative to the chassis;

a ground speed sensor supported by the chassis for determining a ground speed of the chassis; and a control system operatively connected with the electric motors and the ground speed sensor, the control system configured to:

calculate a difference between a rotational speed of each drive wheel connected to each of the electric motors and the ground speed of the chassis to determine a target slip between each wheel and a driving plane to rotate the chassis about an axis of rotation by a target angle of rotation;

calculate a torque output and a speed output for each of the electric motors, wherein the torque output and speed output of the first electric motor on the first side of the chassis is different than the torque output and speed output of the second electric motor on the second side of the chassis;

wherein a difference between the calculated torque output and speed output between the first electric motor and the second electric motor creates a difference in wheel slip between the first and second sides of the chassis that corresponds to the target angle of rotation; and adjust the torque output and speed output of each of the electric motors based on the calculated torque output and speed output for each of the electric motors to apply a torque vector to the chassis to rotate the chassis about the axis of rotation by the target angle of rotation from a first trajectory angle to a target trajectory angle.

2. The overrunable test vehicle of claim 1, wherein the drive wheel attached to the first electric motor of the first axle arrangement is longitudinally aligned with the drive wheel attached to the first electric motor of the second axle arrangement, and wherein the drive wheel attached to the second electric motor of the first axle arrangement is longitudinally aligned with the drive wheel attached to the second electric motor of the second axle arrangement.

3. The overrunable test vehicle of claim 1 further comprising a suspension system with a damper disposed between each electric motor and corresponding drive wheel of the first axle arrangement and the second axle arrangement.

4. The overrunable test vehicle of claim 1, wherein the axis of rotation is defined by the chassis between a first end and a second end with the axis of rotation being a central axis transverse to the driving plane between the first end and the second end corresponding with a center of gravity.

5. The overrunable test vehicle of claim 1, wherein the torque output for at least one electric motor on the first axle arrangement is the same as at least one electric motor on the second axle arrangement.

6. The overrunable test vehicle of claim 1, wherein the control system is configured to command the electric motors to move the overrunable test vehicle to 80 kph or faster and perform a lane change maneuver.

7. The overrunable test vehicle of claim 1, wherein the axis of rotation corresponds to a center of gravity of the overrunable test vehicle.

8. An overrunable test vehicle for dynamic vehicle testing of advanced driver assistant systems along a driving plane, the overrunable test vehicle comprising:

a chassis with a first end, a second end, a first side, and a second side, the chassis including a mounting area configured to receive a soft target, and the chassis defining an axis of rotation transverse to the driving plane between the first end and the second end;

four drive mechanisms coupled with the chassis with each drive mechanism having an electric motor with a drive wheel held in a fixed alignment relative to the chassis, wherein two of the four drive mechanisms are coupled to the first side of the chassis and another two of the four drive mechanisms are coupled to the second side of the chassis; and a control system coupled with the electric motors, the control system configured to:

determine a target slip between each wheel and a driving plane to rotate the chassis about an axis of rotation by a target angle of rotation based on a rotational speed of each drive wheel and a ground speed of the chassis;

calculate a torque output and a speed output for each of the electric motors, wherein the torque output and speed output of the electric motors on the first side of the chassis is different than the torque output and speed output of the electric motors on the second side of the chassis; and adjust the torque output and speed output of each of the electric motors based on the calculated torque output and speed output for each of the electric motors to induce negative wheel slip for the two drive mechanisms on one of the first side and the second side of the chassis and a positive wheel slip for the other two drive mechanisms on the other of the first side and the second side of the chassis to form a torque vector to rotate the overrunable test vehicle about the axis of rotation by the target angle of rotation;

wherein the axis of rotation is a location between the four drive mechanisms when the torque vector is applied to the chassis of the overrunable test vehicle.

9. The overrunable test vehicle of claim 8 further comprising a ground speed sensor operatively connected to the controller and supported by the chassis for determining the ground speed of the chassis.

10. The overrunable test vehicle of claim 8, wherein the drive mechanisms are arranged with two drive mechanisms in the first end of the chassis and two drive mechanisms in the second end of the chassis.

11. The overrunable test vehicle of claim 8, wherein the chassis includes a bottom cover having a pocket corresponding to each of the drive mechanisms to permit each drive wheel of the respective drive mechanisms to extend below the bottom cover.

12. The overrunable test vehicle of claim 8 further comprising a suspension system with a damper disposed between each electric motor and corresponding drive wheel of the four drive mechanisms.

13. The overrunable test vehicle of claim 8, wherein the axis of rotation corresponds to a center of gravity of the overrunable test vehicle.

14. A method for maneuvering an overrunable test vehicle at highway speeds with the overrunable test vehicle including a chassis defining an axis of rotation, and four electric motors connected to the chassis and each having a wheel held in a fixed alignment relative to the chassis, and a control system; the method comprising:

determining a ground speed of the overrunable test vehicle while the overrunable test vehicle is traveling along a first trajectory;

determining a first target angle of rotation of the overrunable test vehicle about the axis of rotation corresponding to a first target trajectory;

calculating a wheel slip based on a ground speed of the overrunable test vehicle using the control system;

calculating individual torque and speed outputs for each of the four electric motors, wherein the torque and speed outputs of the electric motors on a first side of the chassis is different than the torque and speed outputs of the electric motors on a second side of the chassis; and rotating the overrunable test vehicle about the axis of rotation to the first target angle of rotation from the first trajectory by using the control system to adjust the speed and torque outputs of each of the electric motors to create a difference in wheel slip between the first and second sides of the chassis to apply a first torque vector to the overrunable test vehicle.

15. The method of claim 14 wherein rotating the overrunable test vehicle from the first trajectory to the first target trajectory places the overrunable test vehicle on a second trajectory; and wherein the method further comprises:

determining a second target angle of rotation of the overrunable test vehicle about the axis of rotation corresponding with a second target trajectory;

calculating the wheel slip based on the ground speed of the overrunable test vehicle using the control system;

calculating individual torque and speed outputs for each of the four electric motors, wherein the torque and speed outputs of the electric motors on the first side of the chassis is different than the torque and speed outputs of the electric motors on the second side of the chassis; and rotating the overrunable test vehicle about the axis of rotation to the second target angle of rotation from the second trajectory by using the control system to adjust the speed and torque outputs of each of the electric motors to create a difference in wheel slip between the first and second sides of the chassis to apply a second torque vector to the overrunable test vehicle to rotate the overrunable test vehicle from the second trajectory to the second target trajectory.

16. The method of claim 14, wherein the speed and torque of at least two of the four electric motors are the same.

17. The method of claim 14, wherein the overrunable test vehicle performs a lane change maneuver at 80 kph or faster.

18. The method of claim 14, wherein the overrunable test vehicle rotates in a circle of 10 meters or less.

* * * * *